(12) United States Patent
Siomina

(10) Patent No.: US 9,894,621 B2
(45) Date of Patent: Feb. 13, 2018

(54) POWER HEADROOM REPORTING ACCOUNTING

(71) Applicant: Telefonaktiebolaget L M Ericsson (publ), Stockholm (SE)

(72) Inventor: Iana Siomina, Täby (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 204 days.

(21) Appl. No.: 14/812,615

(22) Filed: Jul. 29, 2015

(65) Prior Publication Data
US 2016/0037463 A1    Feb. 4, 2016

Related U.S. Application Data

(60) Provisional application No. 62/031,806, filed on Jul. 31, 2014.

(51) Int. Cl.
*H04W 4/00* (2009.01)
*H04W 52/36* (2009.01)
*H04W 76/02* (2009.01)
*H04W 52/38* (2009.01)

(52) U.S. Cl.
CPC ....... *H04W 52/365* (2013.01); *H04W 52/383* (2013.01); *H04W 76/023* (2013.01)

(58) Field of Classification Search
USPC ................................................ 370/252, 311
See application file for complete search history.

(56) References Cited

U.S. PATENT DOCUMENTS

| 2012/0172079 | A1* | 7/2012 | Baldemair | H04W 52/367 455/522 |
| 2013/0324182 | A1* | 12/2013 | Deng | H04W 52/281 455/522 |
| 2014/0274196 | A1* | 9/2014 | Dai | H04W 52/242 455/522 |
| 2014/0321406 | A1* | 10/2014 | Marinier | H04B 7/024 370/329 |

(Continued)

FOREIGN PATENT DOCUMENTS

| CN | 103781111 A | 5/2014 |
| WO | WO 2014/110747 A1 | 7/2014 |

OTHER PUBLICATIONS

PCT Notification of Transmittal of the International Search Report and the Written Opinion of the International Searching Authority, or the Declaration for International application No. PCT/IB2015/055795, dated Oct. 8, 2015.

*Primary Examiner* — Farah Faroul
(74) *Attorney, Agent, or Firm* — Baker Botts LLP

(57) ABSTRACT

A method in a first wireless device of a wireless communications network is disclosed. The method comprises obtaining a power headroom report (PHR) configuration including one or more PHR configuration parameters for an enhanced PHR based at least in part on one or more device-to-device (D2D) transmissions of the first wireless device. The method further comprises estimating a power headroom (PH) according to the obtained PHR configuration, the estimated PH based at least in part on the one or more D2D transmissions of the first wireless device, and transmitting an enhanced PHR to a node of the wireless communications network, the enhanced PHR comprising the PH estimated according to the obtained PHR configuration.

40 Claims, 12 Drawing Sheets

(56) References Cited

U.S. PATENT DOCUMENTS

| | | | |
|---|---|---|---|
| 2015/0055532 A1* | 2/2015 | Lu | H04W 76/043 370/311 |
| 2015/0071212 A1* | 3/2015 | Kim | H04W 72/042 370/329 |
| 2015/0085760 A1* | 3/2015 | Yamada | H04W 24/10 370/329 |
| 2015/0139111 A1* | 5/2015 | Fodor | H04W 52/12 370/329 |
| 2015/0163751 A1* | 6/2015 | Guo | H04W 52/365 455/522 |
| 2015/0163791 A1* | 6/2015 | Chen | H04W 4/008 455/426.1 |
| 2015/0319716 A1* | 11/2015 | Park | H04W 16/32 370/329 |
| 2015/0327187 A1* | 11/2015 | Lu | H04W 52/365 370/329 |
| 2016/0037463 A1* | 2/2016 | Siomina | H04W 52/365 370/330 |
| 2016/0081073 A1* | 3/2016 | Lindoff | H04W 72/1257 370/329 |
| 2016/0143052 A1* | 5/2016 | Yilmaz | H04W 72/1263 370/329 |
| 2016/0198455 A1* | 7/2016 | Caretti | H04W 76/023 370/329 |
| 2017/0013570 A1* | 1/2017 | Vajapeyam | H04W 52/365 |

* cited by examiner

```
-- ASN1START

MAC-MainConfig ::=      SEQUENCE {
    ...
    phr-Config
        release             CHOICE {
                                NULL,
        setup                   SEQUENCE {
            periodicPHR-Timer       ENUMERATED {sf10, sf20, sf50, sf100, sf200,
                                                sf500, sf1000, infinity},
            prohibitPHR-Timer       ENUMERATED {sf0, sf10, sf20, sf50, sf100,
                                                sf200, sf500, sf1000},
            dl-PathlossChange       ENUMERATED {dB1, dB3, dB6, infinity}
        }
    }                                                       OPTIONAL,      -- Need ON
    ...,
    [[ mac-MainConfig-v1020     SEQUENCE {
            extendedPHR-r10         ENUMERATED {setup}      OPTIONAL       -- Need OR
                                                            OPTIONAL       -- Need ON
        }
    ]],
    ...
}

-- ASN1STOP
```

FIGURE 5

POWER HEADROOM REPORTING ACCOUNTING

PRIORITY

This application claims the benefit under 35 U.S.C. § 119(e) of the priority of U.S. Provisional Application 62/031,806 filed on Jul. 31, 2014, entitled "Power Headroom Reporting Accounting," the entire disclosure of which is hereby incorporated by reference.

TECHNICAL FIELD

The present disclosure relates, in general, to wireless communications and, more particularly, to power headroom reporting accounting for device-to-device operation.

BACKGROUND

Wireless communication devices may be able to communicate with other wireless communication devices using device-to-device (D2D) communication in a broad sense. In D2D communication (which may be interchangeably referred to as proximity service (ProSe) or peer-to-peer communication), the source and the target are wireless devices. Thus, using D2D communication, a first wireless device, such as a first user equipment (UE), may be able to receive signals from and/or transmit signals directly to another UE, and vice versa. D2D communication may allow off-loading of the cellular network, faster communication, increased awareness of surrounding wireless devices of interest (e.g., running the same application), higher-quality links due to a shorter distance, etc. D2D communication is being considered for a variety of applications, including video streaming, online gaming, media downloading, peer-to-peer (P2P), file sharing, etc. In 3GPP, ProSe currently comprises at least ProSe Direct Communication and ProSe Direct Discovery, as described in 3GPP TS 23.303 V13.0.0 (2015-06).

FIG. 1 is a schematic block diagram of an example D2D system architecture 100. More particularly, FIG. 1 illustrates an example D2D system architecture 100 in a Long Term Evolution (LTE) network. D2D system architecture 100 includes Evolved UMTS Terrestrial Radio Access Network (E-UTRAN) 105, one or more UEs 110, ProSe APP 115, Evolved Packet Core (EPC) 120, ProSe Function 125, and ProSe APP Server 130. E-UTRAN 105 is a radio access network that may include a combination of UEs 110, such as UEs 110A and 110B, and one or more network nodes, such as one or more eNodeBs.

UEs 110A and 110B may be any type of wireless device communicating with a node and/or with another wireless device in a cellular or mobile communication system. UEs 110A and 110B communicate with E-UTRAN 105 over an LTE-Uu radio interface. UEs 110A and 110B include ProSe APP 115A and ProSe APP 115B, respectively. ProSe APP 115A and 115B may be application layer components that allow UEs 110A and 110B to perform D2D operations. EPC 120 of D2D system architecture 100 is the core network of the LTE system. EPC 120 may include any suitable configuration of hardware and/or software. For example, EPC 120 may include a home subscriber server, a serving gateway, a packet data network gateway, or any other suitable components. E-UTRAN 105 may communicate with EPC 120 over an S1 interface.

ProSe Function 125 and ProSe App Server 130 facilitate D2D communication between UE 110A and UE 110B. ProSe Function 125 is a logical function that may be used for network related actions required for D2D communications. The role of ProSe Function 125 may vary according to particular ProSe features. In some cases, there may be one logical ProSe Function 125 in each public land mobile network (PLMN) that supports Proximity Services. ProSe Function 125 may determine the resources used for D2D communication links (e.g., every second uplink subframe, one subframe per radio frame, etc.).

In Long Term Evolution (LTE), the Power Headroom Reporting (PHR) procedure is used to provide the serving network node (e.g., eNodeB (eNB)) with information about a difference between the nominal UE maximum transmit power and the estimated power for uplink shared channel (UL-SCH) transmission per activated Serving Cell. PHR procedure also provides the serving network node with information about the difference between the nominal UE maximum power and the estimated power for UL-SCH and physical uplink control channel (PUCCH) transmission on the Primary Cell (PCell).

In LTE, the PHR range is from −23 to +40 dB. If the Power Headroom value is (+), it indicates that the wireless device still has some space under the maximum power. If the Power Headroom value is (−), it indicates that the calculated uplink (UL) transmit power is above the UE maximum.

SUMMARY

To address the foregoing problems with existing solutions, disclosed is a method in a first wireless device. The method comprises obtaining a power headroom report (PHR) configuration including one or more PHR configuration parameters for an enhanced PHR based at least in part on one or more device-to-device (D2D) transmissions of the first wireless device. The method further comprises estimating a power headroom (PH) according to the obtained PHR configuration, the estimated PH based at least in part on the one or more D2D transmissions of the first wireless device, and transmitting an enhanced PHR to a node of the wireless communications network, the enhanced PHR comprising the PH estimated according to the obtained PHR configuration.

In certain embodiments, the node of the wireless communications network may comprise a network node or a second wireless device. The enhanced PHR transmitted to the node of the wireless communications network may comprise one of a D2D PHR, an enhanced cellular PHR, and a hybrid PHR. The D2D PHR may comprise a function of one or more of a transmit power parameter for the one or more D2D transmissions of the first wireless device, a D2D transmission configuration parameter of the first wireless device, and a parameter characterizing the distance and/or radio propagation environment between the first wireless device and the node of the wireless communications network. The enhanced cellular PHR may comprise a PHR that reflects a transmit power for one or more cellular transmissions of the first wireless device and is calculated based at least in part on the one or more PHR configuration parameters of the first wireless device. The hybrid PHR may comprise a function of one or more cellular parameters and one or more D2D parameters, the one or more D2D parameters comprising one or more of: a transmit power parameter for the one or more D2D transmissions of the first wireless device; a D2D transmission configuration parameter of the first wireless device; and a parameter characterizing the distance and/or radio propagation environment between the first wireless device and the node of the wireless communications network.

Also disclosed is a first wireless device of a wireless communications network. The first wireless device comprises one or more processors. The one or more processors are configured to obtain a power headroom report (PHR) configuration including one or more PHR configuration parameters for an enhanced PHR based at least in part on one or more device-to-device (D2D) transmissions of the first wireless device. The one or more processors are configured to estimate a power headroom (PH) according to the obtained PHR configuration, the estimated PH based at least in part on the one or more D2D transmissions of the first wireless device, and transmit an enhanced PHR to a node of the wireless communications network, the enhanced PHR comprising the PH estimated according to the obtained PHR configuration.

Also disclosed is a method in a node of a wireless communications network. The method comprises determining one or more power headroom report (PHR) configuration parameters, the one or more PHR configuration parameters for use by a first wireless device to estimate a power headroom (PH) based at least in part on one or more device-to-device (D2D) transmissions of the first wireless device. The method further comprises sending the determined one or more PHR configuration parameters to the first wireless device.

Also disclosed is a node of a wireless communications network. The node comprises one or more processors. The one or more processors are configured to determine one or more power headroom report (PHR) configuration parameters, the one or more PHR configuration parameters for use by a first wireless device to estimate a power headroom (PH) based at least in part on one or more device-to-device (D2D) transmissions of the first wireless device. The one or more processors are configured to send the determined one or more PHR configuration parameters to the first wireless device.

Also disclosed is a method in a node of a wireless communications network. The method comprises receiving an enhanced power headroom report (PHR) from a first wireless device, the enhanced PHR based at least in part on one or more device-to-device (D2D) transmissions of the first wireless device. The method further comprises performing one or more radio operations using the received PHR.

Also disclosed is a node of a wireless communications network. The node comprises or more processors. The one or more processors are configured to receive an enhanced power headroom report (PHR) from a first wireless device, the enhanced PHR based at least in part on one or more device-to-device (D2D) transmissions of the first wireless device. The one or more processors are configured to perform one or more radio operations using the received enhanced PHR.

Certain embodiments of the present disclosure may provide one or more technical advantages. For example, certain embodiments may allow user equipment power headroom reporting to be controlled during D2D operation. As another example, certain embodiments may allow for power headroom reporting in subframes with D2D transmissions. As yet another example, certain embodiments may provide improved D2D power control accounting for PHR based on the pathloss for the D2D link. Other advantages may be readily apparent to one having skill in the art. Certain embodiments may have none, some, or all of the recited advantages.

BRIEF DESCRIPTION OF THE DRAWINGS

For a more complete understanding of the disclosed embodiments and their features and advantages, reference is now made to the following description, taken in conjunction with the accompanying drawings, in which:

FIG. 5 is an example PHR configuration via radio resource control, in accordance with certain embodiments;

DETAILED DESCRIPTION

PHR procedures indicate to the network an amount of transmit power left in a UE after using transmit power for cellular communications. When only cellular communications are involved, there may be no other transmissions to consider, and the network may be provided with a reliable indication of the amount of transmit power left in the UE. As described above, however, a UE may be D2D capable. In such a case, the existing PHR may be misleading. If a UE is making one or more D2D transmissions, in addition to cellular communications, then the PHR communicated to the network may not provide an accurate indication of the amount of power left in the UE for other purposes. For example, in some cases, the remaining power indicated by a PHR determined according to existing procedures may have been used by the UE for D2D communications.

Thus, existing PHR procedures suffer from certain deficiencies. For example, there may be no sufficient means in the network to determine the transmit power used by the UE for its D2D transmission(s), and there may be no means to control UE PHR accounting for its D2D transmission(s). As another example, the currently standardized PHR for cellular operation (for PUSCH and PUCCH) may be erroneously interpreted by the network, particularly if the network is not aware of the UE D2D operation. As yet another example, a UE may be using its transmit power for D2D operation but not for cellular operation, and/or the existing PHR triggers may not reflect D2D operation, which would make the PHR reporting irrelevant. Thus, there is a need for a method of PHR reporting that accounts for UE D2D transmissions in reporting and/or configuring UE PHR.

The present disclosure contemplates various embodiments that may advantageously account for UE D2D transmissions in reporting and/or configuring UE PHR. For example, in certain embodiments one or more types of enhanced PHRs may account for UE D2D transmission(s). The one or more types of enhanced PHRs may be estimated and transmitted by a first UE to another node, such as, for example, a second UE or a network node (e.g., eNodeB). In certain embodiments, the enhanced PHR that accounts for UE D2D transmission(s) may be one or more of: a D2D PHR that primarily reflects the UE transmit power for D2D transmission(s); an enhanced Cellular PHR that may primarily reflect the UE transmit power for cellular transmission(s) but also accounts for UE D2D transmission(s); and a Hybrid PHR that reflects transmit power for both D2D transmission(s) and cellular transmission(s).

Figure 1:
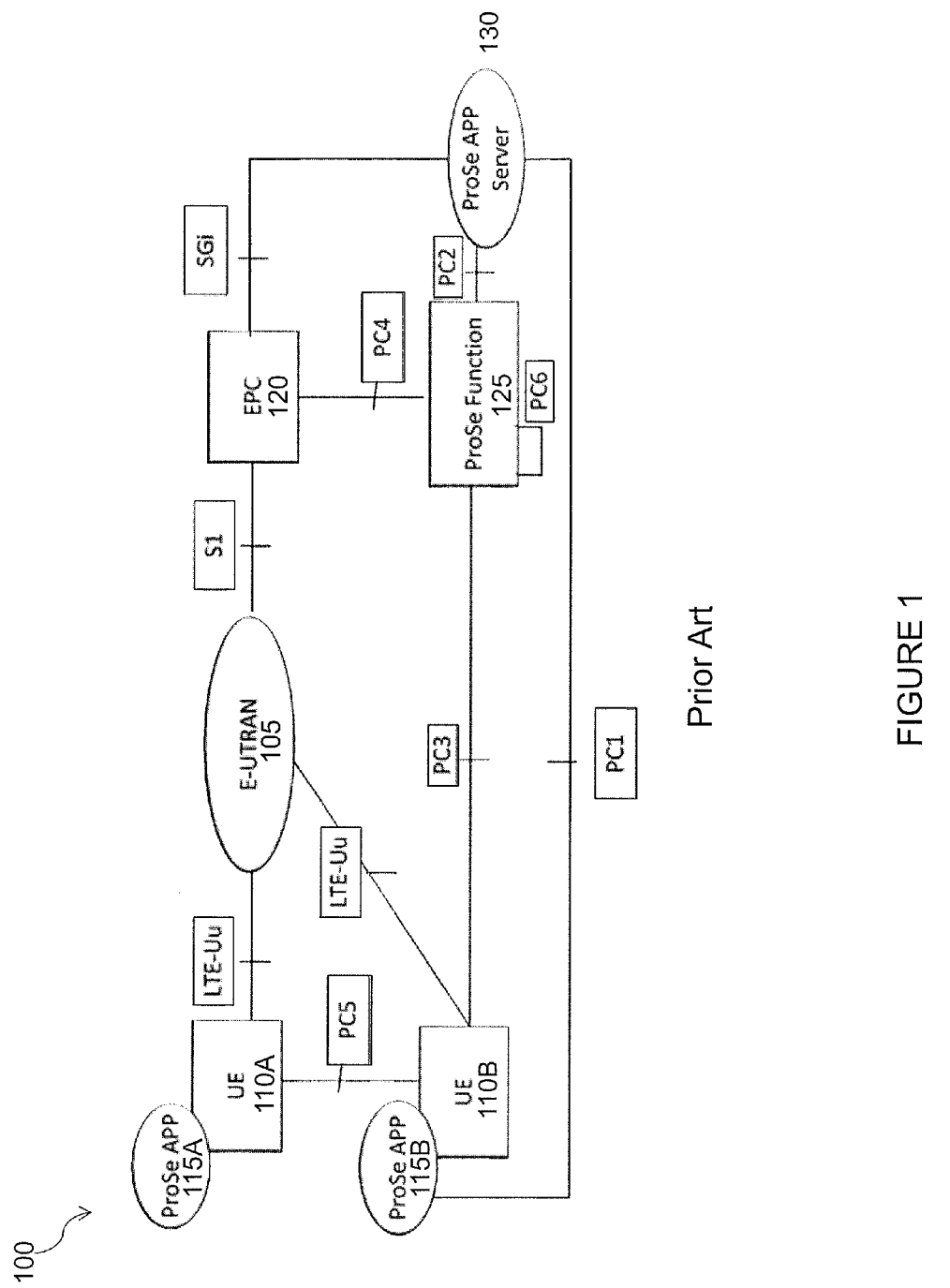
FIG. 1 is a schematic block diagram of an example D2D system architecture; in accordance with certain embodiments.
Figure 2:
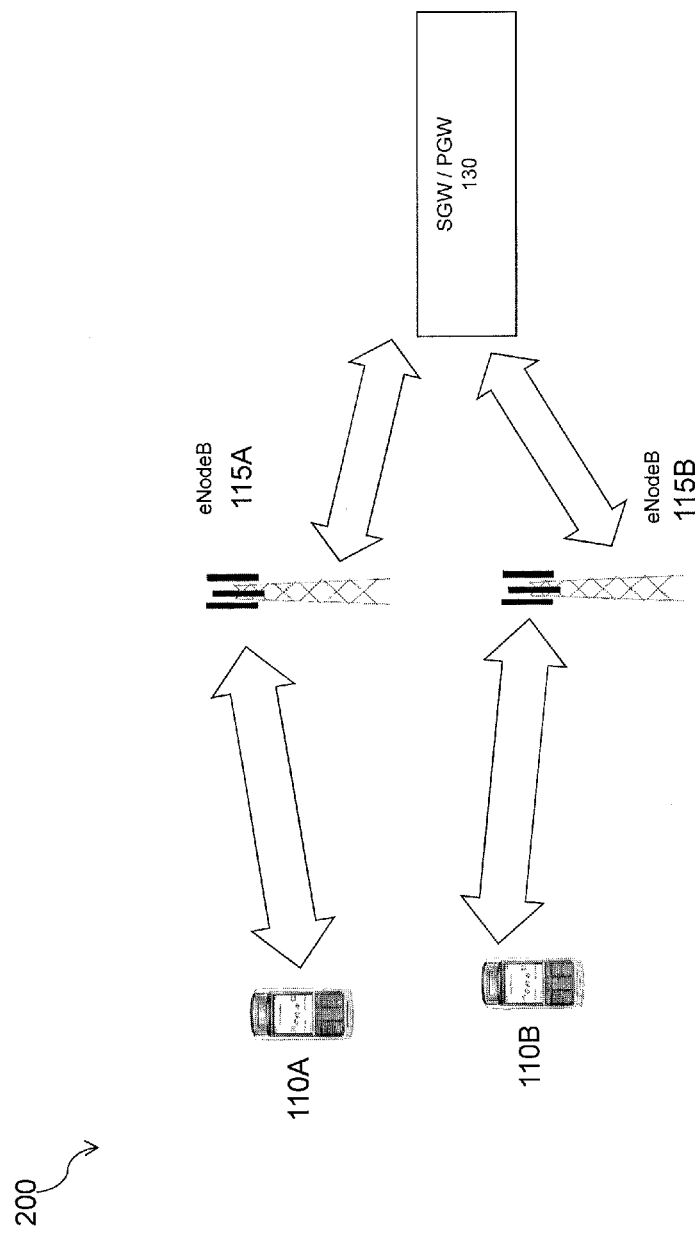
FIG. 2 is a schematic diagram of a data path scenario in the evolved packet system for cellular communication between wireless devices and network nodes, in accordance with certain embodiments.

FIG. 2 is a schematic diagram of a data path scenario for cellular communication between wireless devices 110 and network nodes 115 in an example wireless communications network 200, in accordance with certain embodiments. Network 200 includes one or more wireless device(s) 110 (which may be interchangeably referred to as UEs 110), radio network node(s) 115 (which may be interchangeably referred to as eNBs 115), and core network node(s) 130. UE 110 may communicate with a network node 115 over a wireless interface. For example, UE 110A may transmit wireless signals to network node 115A and/or receive wireless signals from network node 115A. The wireless signals may contain voice traffic, data traffic, control signals, and/or any other suitable information. In some embodiments, an area of wireless signal coverage associated with a network node 115 may be referred to as a cell.

UEs 110 may have D2D capability (i.e., UEs 110 may be capable of D2D operations). A D2D capable UE 110 may be interchangeably referred to as a UE, D2D UE, a D2D device, or D2D-capable UE). D2D operation may include any suitable action or activity related to D2D. For example, D2D operations may include: transmitting or receiving a signal/channel type for a D2D purpose; transmitting or receiving data by D2D communication; transmitting or receiving control or assistance data for a D2D purpose; transmitting or receiving a request for control or assistance data for D2D; selecting a D2D operation mode; initiating/starting D2D operation; switching to D2D operation mode from a cellular operation mode; configuring receiver or transmitter with one or more parameters for D2D; or any other suitable operation. In some cases, D2D operation may be used for a commercial purpose, or to support public safety, using the data related to D2D. D2D operation may or may not be specific to a certain D2D service. Thus, UE 110 may be able to receive signals from and/or transmit signals directly to another UE. For example, UE 110A may be able to receive signals from and/or transmit signals to UE 110B. D2D communication between UEs 110A and 110B may take place using, for example, a "direct mode" of communication or a "locally-routed" path for data communication if the wireless devices are in proximity to each other. Direct-mode and locally-routed scenarios are described in more detail below in relation to FIGS. 6 and 7.

In certain embodiments, network nodes 115 may interface with a radio network controller. The radio network controller may control radio network node 115 and may provide certain radio resource management functions, mobility management functions, and/or other suitable functions. In certain embodiments, the functions of a radio network controller may be performed by network node 115. The radio network controller may interface with core network node 130. In certain embodiments, the radio network controller may interface with core network node 130 via an interconnecting network. The interconnecting network may refer to any interconnecting system capable of transmitting audio, video, signals, data, messages, or any combination of the preceding.

In some embodiments, core network node 130 may manage the establishment of communication sessions and various other functionality for UEs 110. UEs 110 may exchange certain signals with core network node 130 using the non-access stratum layer. In non-access stratum signaling, signals between UEs 110 and core network node 130 may be transparently passed through the radio access network. In certain embodiments, network nodes 115 may interface with one or more network nodes over an internode interface. For example, network nodes 115A and 115B may interface over an X2 interface.

In some embodiments, a coordinating node may schedule, decide, and/or select, at least in part, one or more time-frequency resources to be used for at least one of cellular transmissions and D2D transmissions. Cellular operation (e.g., by UE 110) may include any action or activity related to a cellular network (e.g., any one or more radio access technologies (RATs)). For example, cellular operation may include a radio signal transmission, a radio signal reception, performing a radio measurement, performing a mobility operation or RRM related to cellular network, or any other suitable operation. D2D transmission is any transmission by a D2D device. Some examples of D2D transmission include physical signals or physical channels, dedicated or common/shared (e.g., reference signal, synchronization signal, discovery channel, control channel, data channel, broadcast channel, paging channel, scheduling assignment (SA) transmissions, etc.). A D2D transmission on a direct radio link is intended for receiving by another D2D device. A D2D transmission may be a unicast, groupcast, or broadcast transmission. A D2D transmission may be on the uplink time-frequency resources of a wireless communication network. In certain embodiments, the coordinating node may also provide the scheduling information to another node (such as another D2D device 110, a cluster head, network node 115, or another network node (e.g. core network node 130). The coordinating node may communicate with network node 115.

UE 110 may be any entity capable of at least receiving or transmitting radio signals on a direct radio link (i.e., between this entity and another D2D capable entity). UE 110 may be a cellular UE, PDA, a wireless device, laptop, mobile, sensor, relay, D2D relay, or even a small base station employing a UE-like interface, etc. Wireless device 110 may be able to support at least one D2D operation. Network node 115 may be a radio network node or any other suitable node. Some examples of a radio network node include a radio base station, a relay node, an access point, a cluster head, RNC, etc. The radio network node is included in a wireless communication network and may also support cellular operation. Some examples of other suitable network nodes include a core network node, MME, a node controlling at least in part mobility of a wireless device, SON node, O&M node, positioning node, a server, an application server, a D2D server (which may be capable of some but not all D2D-related features), a node comprising a ProSe function, a ProSe server, an external node, or a node included in another network. Example embodiments of wireless device 110, network node 115, and other nodes (such as a radio network controller or core network node 130) are described with respect to FIGS. 10, 11, and 12, respectively.

Although FIG. 2 illustrates a particular arrangement of network 200, the present disclosure contemplates that the various embodiments described herein may be applied to a variety of networks having any suitable configuration. For example, network 200 may include any suitable number of wireless devices 110 and network nodes 115, as well as any additional elements suitable to support communication between UEs or between a UE and another communication device (such as a landline telephone). Furthermore, although certain embodiments may be described as implemented in an LTE network, the present disclosure contemplates that the various embodiments may be implemented in any appropriate type of telecommunication system supporting any suitable communication standards and using any suitable components, and are applicable to any radio access technology (RAT) or multi-RAT systems in which a UE receives and/or transmits signals (e.g., data). For example, network 200 may be any suitable network, such as an LTE network (FDD or TDD), UTRA network, CDMA network, WiMAX, GSM network, or any other suitable network employing any one or more radio access technologies (RATs) for cellular operation. The various embodiments described herein may be applicable to LTE FDD/TDD, WCDMA/HSPA, GSM/GERAN, Wi Fi, WLAN, WiMAX, CDMA2000, or any other suitable RAT. Furthermore, although some of the embodiments are described for D2D transmissions in the UL spectrum (FDD) or UL resources (TDD), the embodiments are not limited to the usage of UL radio resources, neither to licensed or unlicensed spectrum, or any specific spectrum at all.

In multi-carrier or carrier aggregation system, a carrier is generally termed as a component carrier (CC) or sometimes is also referred to a cell or serving cell. In principle each CC has multiple cells. The term carrier aggregation (CA) is also called (e.g. interchangeably called) "multi-carrier system", "multi-cell operation", "multi-carrier operation", "multi-carrier" transmission and/or reception. This means the CA is used for transmission of signaling and data in the uplink and/or downlink directions. One of the CCs is the primary component carrier (PCC) or simply primary carrier or even anchor carrier. The remaining ones are called secondary component carrier (SCC) or simply secondary carriers or even supplementary carriers. Generally the primary or anchor CC carries the essential UE specific signaling. The primary CC (aka PCC or PCell) exists in both uplink and downlink directions in CA. In case there is single UL CC the PCell is obviously on that CC. The network may assign different primary carriers to different UEs operating in the same sector or cell.

As described above, PH reporting is used to provide the serving network node 115 with transmit power information. There are two types of UE PHRs defined in TS 36.213, Type 1 and Type 2. A UE power headroom is valid for subframe i for serving cell c.

PHR of Type 1 includes the term for physical uplink shared channel (PUSCH) only, and is defined for serving cell c in subframe i in general as follows:

$$PH_{type1,c}(i) = P_{CMAX,c}(i) - P_{calc\_PUSCH,c}$$

[dB], where the calculated PUSCH transmit power is equal to:

$$P_{calc\_PUSCH,c} = \{10 \log_{10}(M_{PUSCH,c}(i)) + P_{O\_PUSCH,c}(j) + \alpha_c(j) \cdot PL_c + \Delta_{TF,c}(i) + f_c(i)\}.$$

In the above, if primary uplink control channel (PUCCH) is also transmitted in the same subframe, then $\tilde{P}_{CMAX,c}(i)$ (compensated for the PUCCH transmission and calculated with zero MPR, A-MPR, and P-MPR) is used instead of $P_{CMAX,c}(i)$. If PUSCH is not transmitted in subframe i, then:

$$P_{calc\_PUSCH,c} = \{P_{O\_PUSCH,c}(1) + \alpha_c(1) \cdot PL_c + f_c(i)\}.$$

PHR Type 2 includes the term for PUSCH and PUCCH, and is defined for serving cell c in subframe i in general as follows:

$$PH_{type2}(i) = P_{CMAX,c}(i) - 10\log_{10}\left(10^{(P_{calc\_PUSCH,c})/10} + 10^{(P_{calc\_PUCCH,c})/10}\right)$$

[dB], where the calculated PUSCH transmit power:

$$P_{calc\_PUSCH,c} = \{10 \log_{10}(M_{PUSCH,c}(i)) + P_{O\_PUSCH,c}(j) + \alpha_c(j) \cdot PL_c + \Delta_{TF,c}(i) + f_c(i)\},$$

and the calculated PUCCH transmit power is equal to:

$$P_{calc\_PUCCH,c} = P_{0\_PUCCH} + PL_c + h(n_{CQI}, n_{HARQ}, n_{SR}) + \Delta_{F\_PUCCH}(F) + \Delta_{TxD}(F) + g(i).$$

If PUSCH is not transmitted in subframe i, then:

$$P_{calc\_PUSCH,c} = \{P_{O\_PUSCH,c}(1) + \alpha_c(1) \cdot PL_c + f_c(i)\}.$$

If PUCCH is not transmitted in subframe i, then:

$$P_{calc\_PUCCH,c} = P_{0\_PUCCH} + PL_c + g(i).$$

Furthermore, if neither PUSCH nor PUCCH is transmitted in subframe i, then $\tilde{P}_{CMAX,c}(i)$ calculated with zero MPR, A-MPR, and P-MPR is used instead of $P_{CMAX,c}(i)$.

Figure 3:
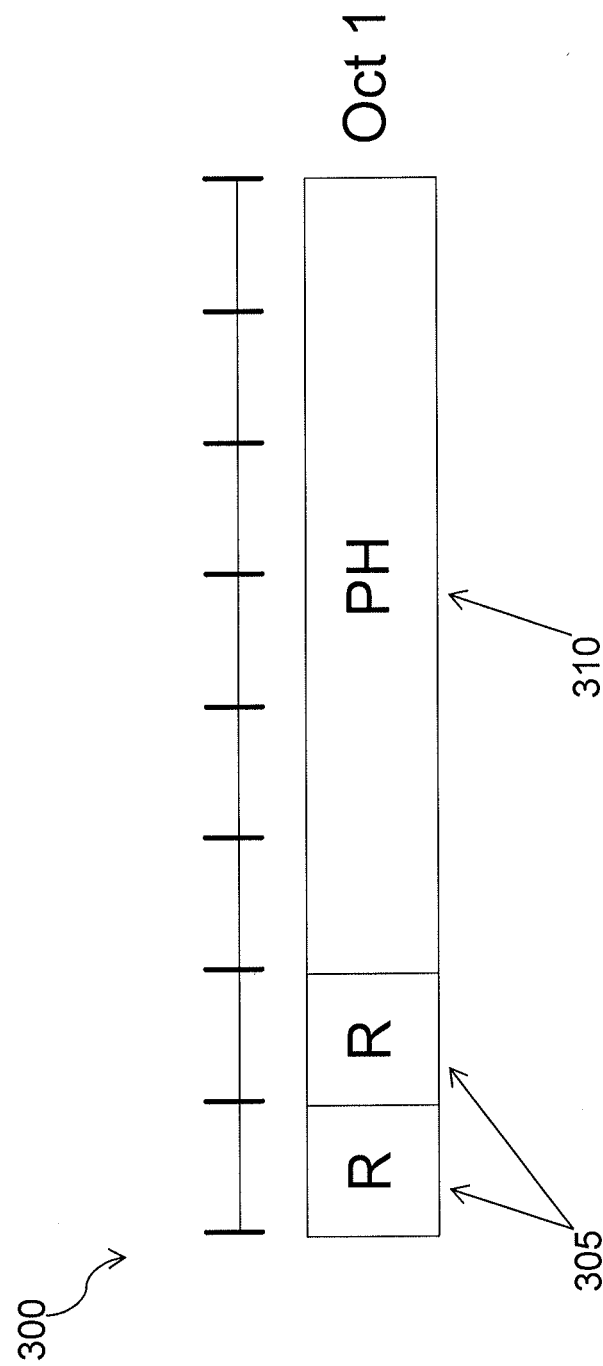
FIG. 3 is a schematic diagram of a PHR MAC control element, in accordance with certain embodiments.

FIG. 3 is a schematic diagram of a PHR MAC control element 300, in accordance with certain embodiments. The PHR is a type of MAC Control Element (MAC CE) that reports the headroom between the current UE transmission (Tx) power (estimated power) and the nominal power. It has a fixed size, and consists of a single octet. 'R' field 305 indicates a reserved bit set to "0", and 'PH' field 310 indicates the power headroom level.

Figure 4:
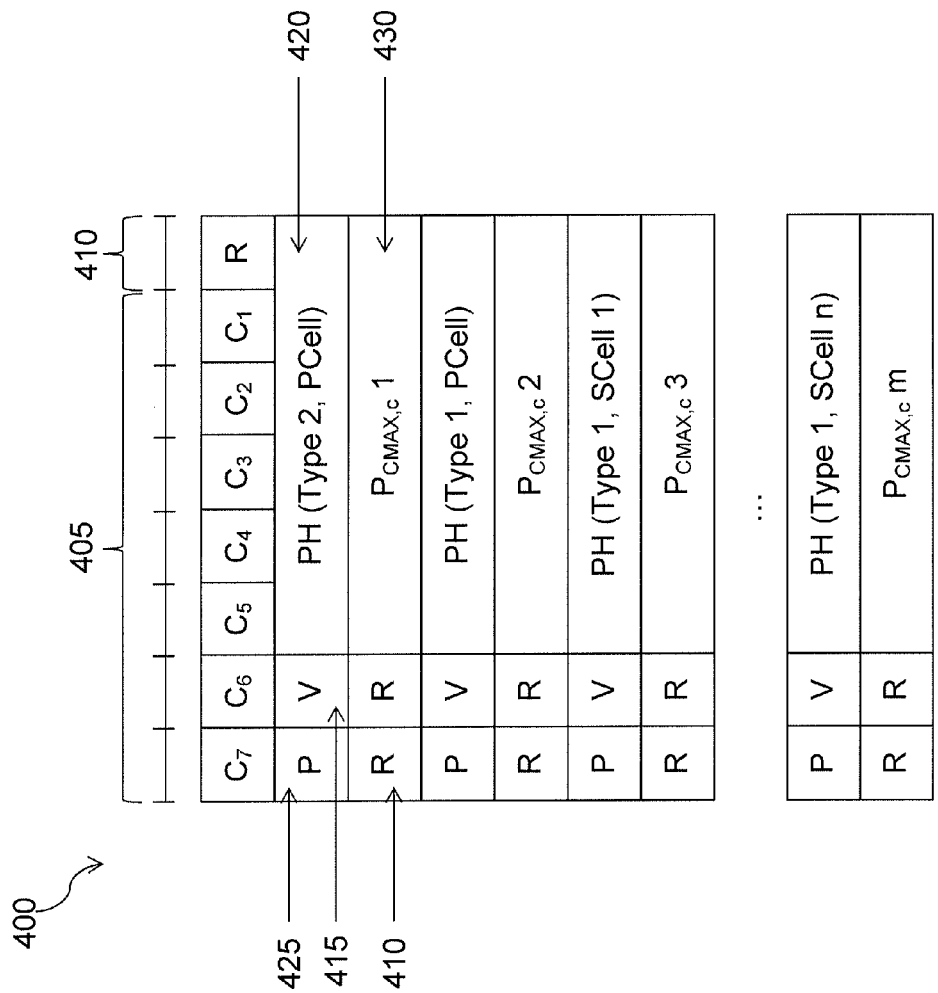
FIG. 4 is a schematic diagram of an extended PHR MAC control element, in accordance with certain embodiments.

FIG. 4 is a schematic diagram of an extended PHR MAC control element 400, in accordance with certain embodiments. Extended PHR MAC control element 400 may have a variable size. In certain embodiments, when Type 2 PH is reported, the octet containing the Type 2 PH field is included first after the octet indicating the presence of PH per SCell and is followed by an octet containing the associated $P_{CMAX,c}$ field (if reported). Then follows in ascending order based on the ServCellIndex an octet with the Type 1 PH field and an octet with the associated $P_{CMAX,c}$ field (if reported), for the PCell and for each SCell indicated in the bitmap.

Extended PHR MAC Control Element 400 may be defined as follows. The Ci field 405 indicates the presence of a PH field for the SCell with SCellIndex i. Thus, the Ci field set to "1" indicates that a PH field for the SCell with SCellIndex i is reported, while the Ci field set to "0" indicates that a PH field for the SCell with SCellIndex i is not reported. The R field 410 indicates a reserved bit, set to "0". The V field 415 indicates if the PH value is based on a real transmission or a reference format. For example, for Type 1 PH, V=0 indicates real transmission on PUSCH and V=1 indicates that a PUSCH reference format is used. For Type 2 PH, V=0 indicates real transmission on PUCCH and V=1 indicates that a PUCCH reference format is used. Furthermore, for both Type 1 and Type 2 PH, V=0 indicates the presence of the octet containing the associated $P_{CMAX,c}$ field, and V=1 indicates that the octet containing the associated $P_{CMAX,c}$ field is omitted. The PH field 420 indicates the power headroom level. The length of the field may be 6 bits. The P field 425 indicates whether the UE applies power backoff due to power management (as allowed by P-MPRc). The UE shall set P=1 if the corresponding $P_{CMAX,c}$ field would have had a different value if no power backoff due to power management had been applied. The $P_{CMAX,c}$ field 430, if present, indicates the $P_{CMAX,c}$ used for calculation of the preceding PH field 420.

FIG. 5 is an example PHR configuration 700 via radio resource control, in accordance with certain embodiments. Radio resource control (RRC) may control PH reporting by configuring two timers: periodicPHR-Timer 505 and prohibitPHR-Timer 510. RRC further controls PH reporting by signalling dl-PathlossChange 515, which sets the change in measured downlink pathloss and the required power backoff due to power management (as allowed by P-MPRc) to trigger a PHR. The PHR configuration parameters in RRC are shown in Table 1 below.

TABLE 1

MAC-MainConfig Field Descriptions dl-PathlossChange

DL pathloss, Change and the change of the required power backoff due to power management (as allowed by P-MPRc in 36.101) for PHR reporting in TS 36.321 [6]. Value in dB. Value dB1 corresponds to 1 dB, dB3 corresponds to 3 dB and so on. The same value applies for each serving cell (although the associated functionality is performed independently for each cell).

...

extendedPHR

Indicates if power headroom shall be reported using the Extended Power Headroom Report MAC control element defined in TS 36.321 (value setup). Otherwise the power headroom shall be reported using the Power Headroom Report MAC control element defined in TS 36.321 [6]. E-UTRAN always configures the value setup if more than one Serving Cell with uplink is configured. E-UTRAN configures extendedPHR only if phr-Config is configured. The UE shall release extendedPHR if phr-config is released.

...

periodicPHR-Timer

Timer for PHR reporting in TS 36.321. Value in number of sub-frames. Value sf10 corresponds to 10 subframes, sf20 corresponds to 20 subframes and so on.

prohibitPHR-Timer

Timer for PHR reporting in TS 36.321. Value in number of sub-frames. Value sf0 corresponds to 0 subframes sf100 corresponds to 100 subframes and so on.

...

According to existing solutions, a PHR shall be triggered if any of the following events occur. As a first example, PHR shall be triggered if prohibitPHR-Timer 510 expires or has expired and the path loss has changed more than dl-PathlossChange 515 dB for at least one activated Serving Cell (which is used as a pathloss reference since the last transmission of a PHR when the UE has UL resources for new transmission). As a second example, PHR shall be triggered if periodicPHR-Timer 505 expires. As a third example, PHR shall be triggered upon configuration or reconfiguration of the PH reporting functionality by upper layers, which is not used to disable the function. As a fourth example, PHR shall be triggered upon activation of an SCell with configured uplink. As a fifth example, PHR shall be triggered if prohibitPHR-Timer 510 expires (or has expired), when the UE has UL resources for new transmission, and the following is true in this transmission time interval (TTI) for any of the activated Serving Cells with configured uplink: there are UL resources allocated for transmission or there is a PUCCH transmission on this cell, and the required power backoff due to power management (as allowed by $P-MPR_c$) for this cell has changed more than dl-PathlossChange 515 dB since the last transmission of a PHR when the UE had UL resources allocated for transmission or PUCCH transmission on this cell. The UE may avoid triggering a PHR when the required power backoff due to power management decreases only temporarily (e.g. for up to a few tens of milliseconds), and it may avoid reflecting such temporary decrease in the values, of $P_{CMAX,c}$/PH when a PHR is triggered by other triggering conditions.

Assume, for example, that a UE has UL resources allocated for new transmission for this transmission time interval (TTI). According to existing PHR procedures, if it is the first UL resource allocated for a new transmission since the last MAC reset, periodicPHR-Timer 505 may be started. The PHR procedure may vary according to whether extendedPHR 520 is configured. For example, if the PH reporting procedure determines that at least one PHR has been triggered and not cancelled, and if the allocated UL resources can accommodate an Extended PHR MAC control element plus its subheader (if extendedPHR 520 is configured) as a result of logical channel prioritization, then for each activated Serving Cell with a configured uplink, the value of the Type 1 power headroom is obtained. If the UE has UL resources allocated for transmission on this Serving Cell for this TTI, then the value for the corresponding $P_{CMAX,c}$ field from the physical layer is obtained. If simultaneousPUCCH-PUSCH is configured, then the value of the Type 2 power headroom for the PCell is obtained. If the UE has a PUCCH transmission in this TTI, then the value for the corresponding $P_{CMAX,c}$ field from the physical layer is obtained. The Multiplexing and Assembly procedure may be instructed to generate and transmit an Extended PHR MAC control element based on the values reported by the physical layer.

In the case where the Power Headroom reporting procedure determines that at least one PHR has been triggered and not cancelled, and the allocated UL resources can accommodate a PHR MAC control element plus its subheader (i.e., if extendedPHR 520 is not configured), then the value of the Type 1 power headroom from the physical layer is obtained. The Multiplexing and Assembly procedure is instructed to generate and transmit a PHR MAC control element based on the value reported by the physical layer. The periodicPHR-Timer may be started or restarted, the prohibitPHR-Timer may be started or restarted, and all triggered PHR(s) may be cancelled.

Figure 6:
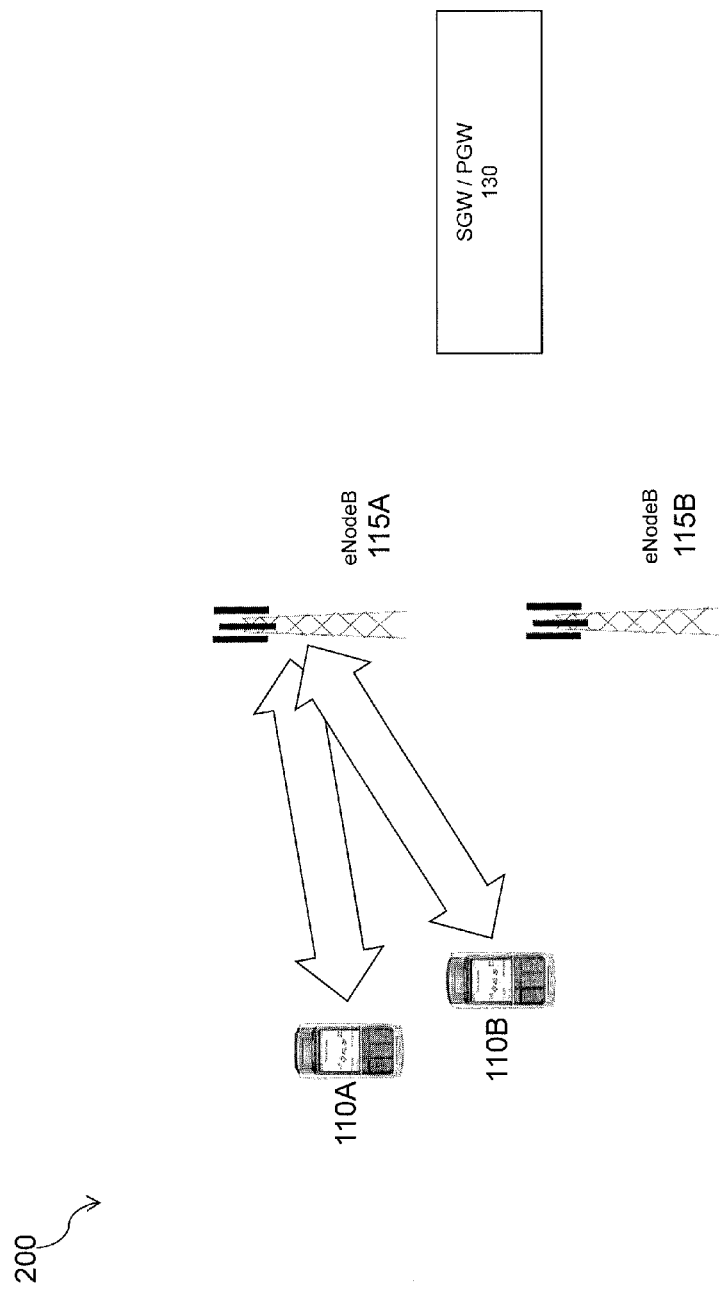
FIG. 6 is a schematic diagram of a locally-routed data path in the evolved packet system between two wireless devices, in accordance with certain embodiments.
Figure 7:
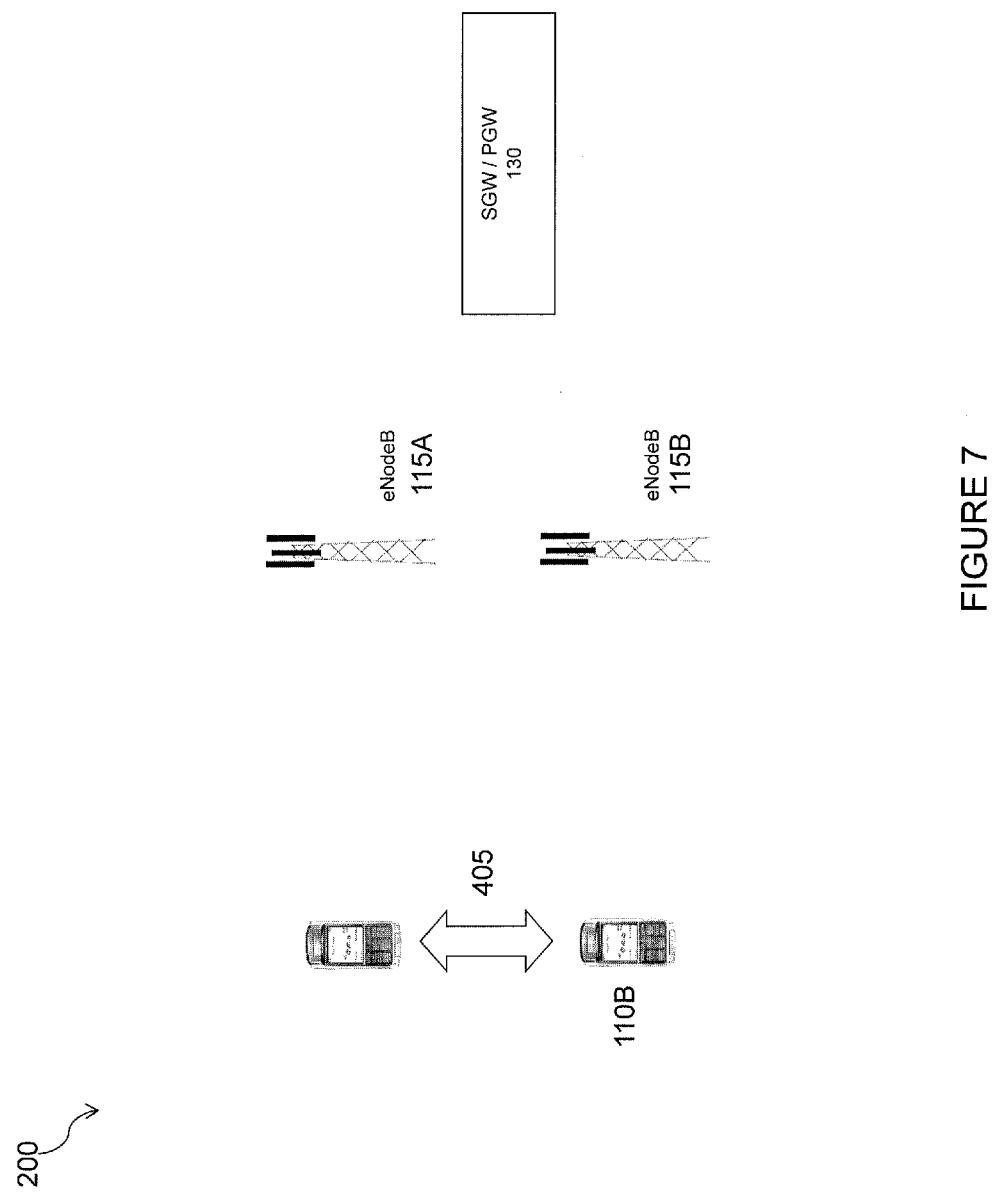
FIG. 7 is a schematic diagram of a direct-mode data path in the evolved packet system, in accordance with certain embodiments.

Existing approaches to PHR reporting, such as those described above, may have certain deficiencies. For example, there may be no sufficient means in the network to determine the transmit power used by the UE for its D2D transmission(s). As another example, there may be no means to control UE PHR accounting for its D2D transmission(s). As yet another example, the currently standardized PHR for cellular operation (for PUSCH and PUCCH) may be erroneously interpreted by the network, particularly if the network is not aware of the UE D2D operation. As still another example, a UE may be using its transmit power for D2D operation but not for cellular operation, and/or the existing PHR triggers may be not reflective to the D2D operation, which would make the PHR reporting irrelevant. Thus, there is a need for a method of PHR reporting that accounts for UE D2D transmissions while reporting and/or configuring UE PHR. FIGS. 6 and 7 illustrate example D2D scenarios in network 200 to which the various embodiments described herein may be applicable.

FIG. 6 is a schematic diagram of a locally-routed data path in the evolved packet system, in accordance with certain embodiments. More particularly, FIG. 6 illustrates one or more UEs 110A and 110B, one or more network nodes 115A and 115B, and one or more core network nodes 130. As described above, UE 110A and UE 110B may be D2D capable and therefore able receive signals from and/or transmit signals directly to another UE. In the locally routed data path scenario illustrated in FIG. 6, UE 110A and UE 110B may be served by the same network node 115. For example, UEs 110A and 110B may be served by network node 115A. In the locally-routed data path scenario, network node 115A may route data to be transmitted from one UE to another UE. For example, UE 110A may desire to transmit data to UE 110B. In such a scenario, UE 110A may transmit data to radio network node 115A, and network node 115A may communicate the data to UE 110B.

FIG. 7 is a schematic diagram of a direct mode data path in the evolved packet system between two wireless devices 110A and 110B, in accordance with certain embodiments. More particularly, FIG. 7 illustrates one or more UEs 110A and 110B, one or more radio network nodes 115A and 115B, and one or more core network nodes 130. As described above, UE 110A and UE 110B may be D2D capable. Thus, UE 110A may be able to receive signals from and/or transmit signals directly to UE 110B, and vice versa. When UE 110A and UE 110B are in proximity of each other, UEs 110A and 110B may be able to use direct link 205 to transmit and receive signals. In such a case, the user plane may be moved to direct link 205 instead of the access and core networks.

The present disclosure contemplates various embodiments that may advantageously account for UE D2D transmissions while reporting and/or configuring UE PHR. For example, in certain embodiments UE 110A may obtain a PHR configuration for an enhanced PHR accounting for its D2D transmission(s). The PHR configuration may include one or more PHR configuration parameters for an enhanced PHR based at least in part on one or more D2D transmissions of UE 110A. UE 110A may estimate an PH according to the obtained PHR configuration. The estimated PH may be based at least in part on the one or more D2D transmissions of UE 110A, and may account for its D2D transmission(s), inline with the obtained PHR configuration. UE 110A may transmit the enhanced PHR to a node of a wireless communications network (such as, for example, a second UE or a network node). For example, the enhanced PHR may account for D2D transmissions of UE 110A (i.e., a first UE) and may be transmitted to another node, such as UE 110B (i.e., a second UE) or a network node, such as network node 115A.

In certain embodiments, the enhanced PHR that accounts for UE 110A's D2D transmission(s) may be one or more of a D2D PHR that primarily reflects the UE transmit power for D2D transmission(s), a Cellular PHR that may primarily reflect the UE transmit power for cellular transmission(s) but accounts for UE 110A's D2D transmission(s), and a Hybrid PHR that reflects transmit power for both D2D transmission(s) and cellular transmission(s). The three PHR types are described in more detail below. Although the various embodiments may be described in terms of UE 110A as a first UE, UE 110B as a second UE, and network node 115 as a network node, the present disclosure contemplates any suitable variations. Furthermore, although certain embodiments are described in relation to the direct-path scenario illustrated in FIG. 7, they are applicable to any other suitable D2D scenarios, such as, for example, the locally-routed scenario described above in relation to FIG. 6.

In certain embodiments, UE 110A may report enhanced PHR of one or more types in parallel (same or different messages, same or different time instances, for the same or different frequencies). The type of enhanced PHR may also be indicated implicitly or explicitly in the PHR and/or in a PHR configuration or request. The enhanced PHR may be estimated and reported in any suitable manner. As one example, the enhanced PHR may be estimated and reported per subframe. As another example, the enhanced PHR may be estimated and reported over a number of subframes or over a time period, which may be pre-defined or configurable.

In certain embodiments, UE 110A may report a D2D PHR. The D2D PHR may primarily reflect the transmit power for UE 110A's D2D transmission(s). The D2D PHR may be a function of any suitable parameters. As one example, the D2D PHR may be a function of at least one transmit power parameter for its one or more D2D transmissions, such that:

$$PH_{D2D} = f(P_{D2D}, \ldots),$$

where $PH_{D2D}$ is the D2D PHR and $P_{D2D}$ is the at least one transmit power parameter for UE 110A's D2D transmission(s). As another example, the D2D PHR may be a function of at least one D2D transmission configuration parameter, such that:

$$PH_{D2D} = f(C_{D2D}, \ldots).$$

where $C_{D2D}$ is the at least one transmission configuration parameter. In some cases, the D2D PHR may be a function of both at least one transmit power parameter and at least one D2D transmission configuration parameter, such that:

$$PH_{D2D} = f(P_{D2D}, C_{D2D}, \ldots).$$

As another example, UE 110A may report a D2D PHR that is a function of at least one parameter characterizing the distance and/or radio propagation environment between the first (transmitting) UE 110A and a second (receiving) UE 110B on the D2D link, such that:

$$PH_{D2D} = f(R_{D2D}, \ldots).$$

In the formulas above and throughout this disclosure, the sign '...' means that the function may or may not depend on other parameters, including the other parameters described in this disclosure. The functions described above may be any suitable function (e.g., difference, sum, weighted sum, minimum of the cellular and D2D components, maximum of the cellular and D2D components, average or a mean, etc.). For example, in certain embodiments the D2D PHR may the difference of the maximum transmit power and the transmit power for cellular and D2D transmissions.

The D2D PHR may be any suitable function of at least one transmit power parameter $P_{D2D}$. $P_{D2D}$ may be any suitable transmit power parameter. Examples of the transmit power parameters $P_{D2D}$ for the actual or virtual (e.g., configured but not transmitted for some reason, such as giving a higher priority to a cellular UL transmission) D2D transmission(s) include: total transmit power for D2D transmission(s) in subframe i; configured maximum transmit power in subframe i; reference or scaled (e.g., for a reference frequency resource such a RB or RE) transmit power for D2D transmission(s) in subframe i; any power reduction applied to the UE transmit power for its D2D transmission(s) in subframe i; any power compensation accounting for the D2D transmission physical characteristics (e.g., format and/or MCS); or any other suitable transmit power parameter.

The D2D PHR may be any suitable function of at least one D2D transmission configuration parameter $C_{D2D}$. $C_{D2D}$ may be any suitable D2D transmission configuration parameter. Examples of the transmission configuration parameter $C_{D2D}$ for the actual or virtual D2D transmission(s) include: D2D transmission resources (e.g., size of frequency resources (such as number of RB or bandwidth) allocated to D2D in subframe i that determine the D2D transmission power); D2D transmission type (e.g., D2D data, D2D control configuration, scheduling assignments, etc.); D2D transmission pattern; D2D transmission periodicity; D2D resource allocation type (e.g., Type 1 when network-controlled and Type 2 when UE-controlled); synchronization reference for the UE D2D transmission; time alignment characteristic characterizing the D2D transmit timing relative to other UE transmissions or receptions.

The D2D PHR may be any suitable function of at least one parameter characterizing the distance and/or radio propagation environment $R_{D2D}$ between the first (transmitting) UE 110A and a second (receiving) UE 110B on the D2D link. $R_{D2D}$ may be any suitable parameter characterizing the distance and/or radio propagation environment between UE 110A and UE 110B. Examples of the parameter characterizing the distance and/or radio propagation environment $R_{D2D}$ on the D2D link include: pathloss; distance or the degree of proximity (absolute, e.g., in meters, or descriptive, e.g., 'far', 'close', 'co-located', etc.); radio measurement (e.g., received signal power); speed (absolute or relative with respect to the second UE); or any other suitable parameter.

In certain embodiments, UE 110A may report an enhanced Cellular PHR. The enhanced Cellular PHR may primarily reflect the transmit power for UE 110A's cellular transmission(s), but account for UE 110A's D2D transmission(s). The enhanced Cellular PHR may be a function of any suitable parameters. In certain embodiments, the enhanced Cellular PHR may account for UE 110A's D2D transmission(s) in in any suitable manner. As one example, the reported PH may not be estimated and/or the PHR may not be triggered in subframes in which UE 110A transmits any or a specific type of D2D transmission (e.g., D2D data or scheduling assignments). As another example, the reported PH may not be estimated and/or the PHR may not be triggered in subframes overlapping at least in part in time with any or a specific type of D2D transmission (e.g., D2D data or scheduling assignments) on the same or a different carrier frequency. As yet another example, the reported PH for cellular transmissions (e.g., for PUSCH or PUCCH) may be compensated for the D2D transmission(s) included or overlapping at least in part with the subframe used as a reference for the PH estimation. In such a case, the maximum transmit power in the reported PH may be adjusted by a compensation that is a function of at least one of $P_{D2D}$, $C_{D2D}$, $R_{D2D}$. As still another example, UE 110A may avoid triggering PHR if D2D transmissions occur in each or some of subframes i (e.g., during more than X % of subframes/time).

In certain embodiments, UE 110A may report a hybrid PHR. The Hybrid PHR may reflect transmit power for both D2D transmission(s) and cellular transmission(s). The hybrid PHR may be a function of one or more cellular parameters $F_{cellular}$ and one or more D2D parameters $F_{D2D}$. For example, in certain embodiments the hybrid PHR $PH_{hybrid}$ may be an explicit function of cellular parameters $F_{cellular}$ and D2D parameters $F_{D2D}$ (which may be, e.g., any one or more of $P_{D2D}$, $C_{D2D}$, and $R_{D2D}$ described above), such that:

$$PH_{hybrid} = f(F_{D2D}, F_{cellular}, \dots),$$

where the UL cellular transmissions and D2D transmissions corresponding to the cellular component and D2D component in the formula above may be on the same or different carrier frequencies.

The hybrid PHR may be any suitable function of the one or more cellular parameters $F_{cellular}$ and one or more D2D parameters $F_{D2D}$. For example, in certain embodiments the function $f(\cdot)$ may be $f_1(\cdot)$ if there are not any D2D transmission or not any of a specific type D2D transmission in subframe i, otherwise it may be $f_2(\cdot)$. As another example, the function may be an aggregate or combining function of the transmit power for the cellular transmission(s) and the transmit power for the D2D transmission(s), wherein the aggregate function may be, for example, sum, weighted sum, minimum of the cellular and D2D components, maximum of the cellular and D2D components, average or a mean.

As described above, UE 110A may obtain a PHR configuration for an enhanced PHR accounting for its D2D transmission(s). The PHR configuration may include one or more parameters for an enhanced PHR based at least in part on one or more D2D transmissions of UE 110A. UE 110A may estimate a PH according to the obtained PHR configuration. UE 110A may obtain the PHR configuration in any suitable manner. For example, in certain embodiments UE 110A may obtain the PHR configuration by using one or more pre-defined parameters or pre-defined rules defining the parameters. As another example, UE 110A may obtain the PHR configuration by reading configuration parameters from internal or external memory. As yet another example, UE 110A may obtain the PHR configuration by receiving configuration parameters from another node (e.g., from a second UE 110B or from network node 115A). In certain embodiments, UE 110A may obtain the PHR configuration using any suitable combination of any of the above.

The PHR configuration may include any suitable parameters. In certain embodiments, the one or more parameters for the PHR configuration may include one or more of: time and/or frequency resources for reporting the enhanced PHR (e.g., PHR periodicity); any timer controlling the time of transmission for the enhanced PHR; an enhanced PHR type indication; subframes eligible for PH estimation, indicated implicitly (e.g., by providing D2D configuration parameters) or explicitly (e.g., a rule, a condition, or an explicit list of subframes that may be used for PH estimation); reference subframe index or subframe type (e.g., with/without D2D transmission) for PH evaluation; and an aggregate function type (e.g., for the hybrid PHR). In certain embodiments, the PHR configuration parameters may include a carrier frequency for which PH is to be evaluated and/or reported. For example, the carrier frequency(-ies) may be the ones with serving cells of UE 110A. As another example, the PH may be estimated on a first carrier frequency that may not have any serving cells of UE 110A, and then reported on a second carrier frequency which is one of the serving frequencies. As yet another example, the PH may be estimated on a first carrier frequency that may not have any serving cells of UE 110A, and then reported on a second carrier frequency which may also not be a serving frequency of UE 110A (e.g., when the reporting is to the second UE).

In certain embodiments, the PHR configuration parameters may include a trigger configuration. The trigger configuration may include any suitable parameters, such as one or more of trigger type and parameters of a specific trigger. The trigger type may be any suitable trigger type. For example, the trigger type may be a DL pathloss change, a D2D link pathloss change, a D2D operation activation in general or of a specific type (e.g., for a specific transmission type, for a specific operation mode such as UE-configured or network-configured, D2D operation type such as D2D discovery or D2D communication, etc.), an increased D2D transmission intensity, a change in a power reduction parameter or in a maximum allowed Tx power parameter (e.g., a cellular specific power reduction such as existing MPR/P-MPR/A-MPR; a D2D specific power reduction or maximum tx power parameter), and a change in the transmit power for D2D transmission. The parameters of a specific trigger may include, for example, an amount of DL pathloss change that should trigger the enhanced PHR, an amount of pathloss change on the D2D link that should trigger the enhanced PHR, an intensity of D2D transmissions that is more than Y % of subframes or time, a change of the power reduction or maximum TX power that is above a threshold, and a change in the transmit power for D2D transmission that is above a threshold.

As described above, UE 110A may transmit an enhanced PHR to a node of the wireless communications network. In certain embodiments, UE 110A may report one or more enhanced PH values. In some cases, the one or more enhanced PH values may be rounded to the allowed report mapping values. In certain embodiments, UE 110A may report PHRs of one or more types. The type of the PHR may be indicated implicitly or explicitly in the UE PHR.

The enhanced PHR may be included in any suitable message. For example, in some cases the enhanced PHR may be included in an existing message used in existing PHR solutions. In some cases, the enhanced PHR may use resources for the reporting that are the same or different from the resources configured for use with existing PHR solutions, or the resources that are configured simultaneously with or independently from configuring the prior art PHR.

The enhanced PHR may include any suitable information in addition to the PH value. For example, in certain embodiments, the enhanced PHR may include additional information comprising any one or more of: an indication on whether and/or how D2D transmission(s) are accounted for; a D2D transmission(s) type; an enhanced PHR type indication; one or more resources used for PH evaluation; the aggregate function type (e.g., for the hybrid PHR); the carrier frequency and/or frequency band for which PH is reported; an indication of whether more PHRs of this type should be expected after the current report; a trigger type; a triggering condition or the value compared versus the condition; a maximum power configuration; and an indication of whether power reduction is used or not and possibly how much.

In certain embodiments, a node may configure UE 110A for transmitting an enhanced PHR accounting for its D2D transmission(s). The node may be any suitable node in a wireless communications network, such as network node 115 or UE 110B for configuring UE 110A for transmitting an enhanced PHR accounting for its D2D transmission(s). The node may determine one or more PHR configuration parameters. The one or more PHR configuration parameters may be used by UE 110A to estimate a PH based at least in part on one or more D2D transmissions of UE 110A. In some cases, the node may send the determined one or more PHR configuration parameters to UE 110A.

The node, e.g., network node 115, may determine the one or more PHR configuration parameters in any suitable manner. As one example, network node 115 may determine the one or more PHR configuration parameters by reading the PHR configuration parameters from internal or external memory. As another example, network node 115 may determine the one or more PHR configuration parameters using pre-defined parameters. As yet another example, network node 115 may determine the one or more PHR configuration parameters by receiving parameters from another node. As still another example, the node may determine the PHR configuration parameters based on a pre-defined rule or requirement. In some cases, the node may determine the one or more PHR configuration parameters using any suitable combination of the above.

In some cases, to account for UE 110A's D2D transmissions, the node may also determine when UE 110A's D2D transmissions occur, before configuring the enhanced PHR. In some cases, when UE 110A's D2D transmissions occur may be pre-defined (e.g., certain subframes or carrier frequencies/bands may be designated for D2D operation), configured by the same node (and can thus be obtained via cross-layer or cross-function communication), indicated by UE 110A (e.g., if the first UE determines itself the resources for its D2D transmissions or have a possibility to indicate its preference), received from another node (e.g., from an eNodeB 115 or a second UE 110B). As another example, the node may configure one or more PHR configuration parameters of the existing PHR and the resource for PHR in such a way that overlap of D2D transmissions and the subframes for cellular PH evaluation is avoided (e.g., by means of adaptively configuring the triggering parameters, timers, etc.).

As described above, in certain embodiments, the node may configure one or more of the configuration parameters for the enhanced PHR and send the PHR configuration to UE 110A. The enhanced PHR configuration parameters may be UE specific, cell-specific, area-specific, or may apply upon a certain condition (e.g., pre-defined or signaled). In some cases, the enhanced PHR configuration parameters may be sent to UE 110A via broadcast, multicast, or unicast.

In certain embodiments, a node may receive the enhanced PHR and use the enhanced PHR accounting for a first UE 110A's D2D transmissions. In such a case, the node may be a second UE 110B or network node 115, or any other suitable node of a wireless communications network. For example, UE 110B (i.e., a second node) may receive an enhanced PHR accounting for UE 110A's D2D transmissions, and UE 110B may use the enhanced PHR to perform one or more radio operations.

In certain embodiments, the node (e.g., UE 110B or network node 115) may receive the PHR in response to the enhanced PHR configuration sent to UE 110A. The enhanced PHR may be received on the same or other carrier frequency than the PH was evaluated.

The received enhanced PHR may be used in any suitable manner. As one example, the enhanced PHR (e.g., any one or more of the D2D PHR, enhanced cellular PHR, or hybrid PHR described above) may be used for one or more operational tasks. The one or more operational tasks may be any suitable operations. For example, in some cases the received enhanced PHR may be used for estimation of the pathloss used for defining the received PH (e.g., for the cellular link or for the D2D link). As another example, the received enhanced PHR may be used for power control of one or more of UL cellular transmissions, DL cellular transmissions (e.g., thanks to the pathloss estimate used for deriving the UE Tx power reflected in the PHR), D2D transmissions (e.g., when the D2D Tx power is based on the cellular pathloss or when the D2D Tx power is based on the D2D link characteristic, such as pathloss). To illustrate, consider a scenario in which Tx power is reduced if the enhanced PHR is negative, or increase Tx power when the enhanced PHR is greater than a threshold. In some cases, the received enhanced PHR may be used for power reduction (a.k.a. power back off such MPR/P-MPR/A-MPR or similar if defined for D2D) configuration. As another example, the received enhanced PHR may be used for scheduling, resource allocation, UE bandwidth configuration, and resource grant configuration for cellular and/or D2D transmissions for the first UE and/or other UEs (e.g., the excessive power consumption may indicate high interference and/or cell edge, so the scheduling of the first UE and the other UEs may be adapted accordingly. The enhanced PHR may be used to determine whether cellular or D2D link is to be used for the data transmission (e.g., based on the pathloss comparison and/or whether the UE tx power is becoming a limiting factor or not for either of the links the network node may select the other link), or for better support for link adaptation for cellular and/or D2D transmissions. In some cases, the enhanced PHR may be used for positioning (e.g., UEs with the same or similar pathloss with respect to the same node or using the same Tx power may be located approximately at the same distance from that node) or configuring radio signal transmissions to enable positioning of the UE (e.g., if the PHR indicates that there is a sufficient room in the UE transmit power, eNodeB may configure SRS or other signals that may be used for positioning measurements performed by the network or other UEs).

In certain embodiments, a node, such as network node 115A, may allocate time-frequency resources for UE 110A to transmit the enhanced PHR. The enhanced PHR may be single-shot, event-triggered, condition-triggered, or periodic. The resources may be allocated in any suitable manner. For example, network node 115A may allocate time-frequency resources via broadcast, multicast, or unicast for UE 110A to transmit the enhanced PHR. The resources may be allocated/granted in the same or different message as the resources for the UE D2D transmission. The enhanced PHR resources allocation may be made in any suitable manner. As one example, the enhanced PHR resource allocation may be autonomous by network node 115A. As another example, the enhanced PHR resources may be allocated upon receiving a request for/indication of a D2D transmission/activity sent by the UE. As yet another example, the enhanced PHR resources may be allocated in conjunction with granting to UE 110A resources for its D2D transmission(s). As still another example, the enhanced PHR resources may be allocated upon receiving a request from UE 110A for the enhanced PHR reporting. In certain embodiments, reporting of the enhanced PHR by UE 110A may become possible when UE 110A receives the allocated resources for enhanced PHR from network node 115A. In some cases, UE 110A may determine the resources for enhanced PHR reporting. In one example, UE 110A may use the same resources for reporting enhanced PHR as is used for reporting PHR according to existing solutions. In another example, the resources for enhanced PHR may be pre-defined (e.g., by the standard) or pre-configured in UE 110A.

PHR accounting for D2D transmissions may be triggered in any suitable manner. In certain embodiments, one or more trigger(s) may be defined or configured for enhanced PHR accounting for D2D transmissions. In some cases, the trigger configuration may be pre-defined in the reporting node. In some cases, the trigger configuration may be configured via cross-layer or by an external source (e.g., through receiving a message from another node, such as network node 115A or another UE 110A).

The enhanced PHR may be sent at any suitable time with respect to a trigger condition. For example, an enhanced PHR may be sent by UE 110A immediately after the trigger condition is fulfilled or a trigger event occurred, or within a certain limited time period after that. As described above, the trigger configuration may include any suitable parameters. For example, the trigger configuration may include a trigger type, such as one or more of: a DL pathloss change; a D2D link pathloss change; a D2D operation activation in general or of a specific type (e.g., for a specific transmission type, for a specific operation mode such as UE-configured or network-configured, D2D operation type such as D2D discovery or D2D communication, etc.); an increased D2D transmission intensity; a change in a power reduction parameter or in a maximum allowed Tx power parameter (e.g., a cellular specific power reduction such as existing MPR/P-MPR/A-MPR; a D2D specific power reduction or maximum Tx power parameter); and a change in the transmit power for D2D transmission. In some cases, the trigger configuration may include one or more parameters of a specific trigger, such as, for example, one or more of an amount of DL pathloss, change that should trigger the enhanced PHR, an amount of pathloss change on the D2D link that should trigger the enhanced PHR, an intensity of D2D transmissions is more than Y % of subframes or time, a change of the power reduction or maximum Tx power is above a threshold, and a change in the transmit power for D2D transmission is above a threshold.

Figure 8:
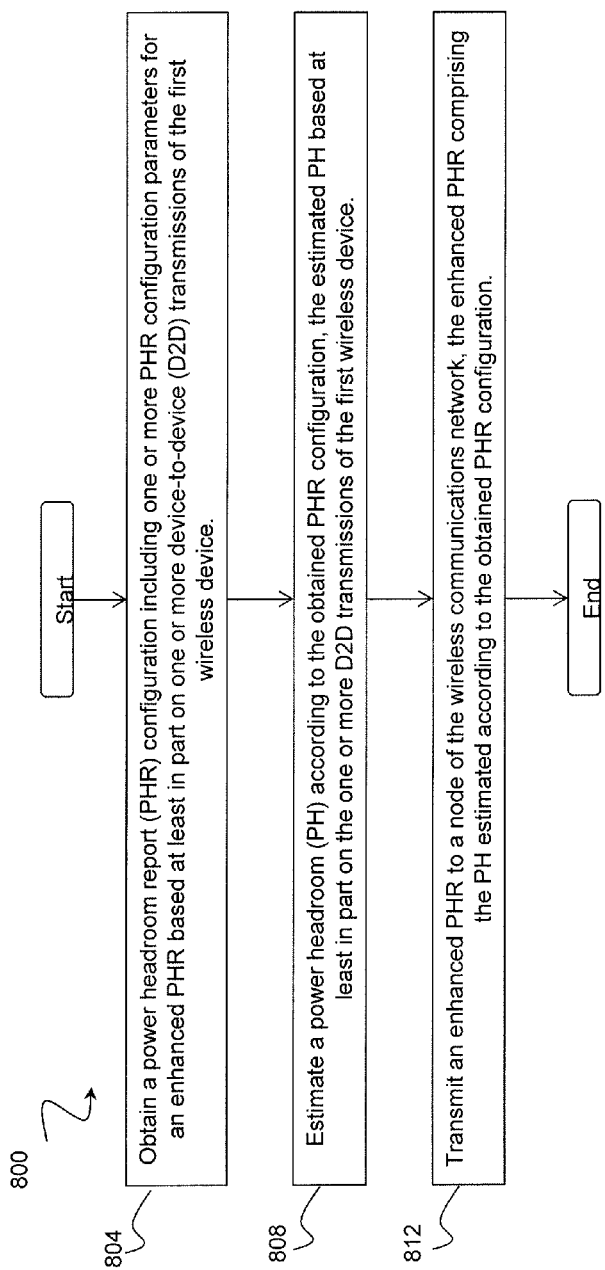
FIG. 8 is a flow chart illustrating a method in a wireless device, in accordance with an embodiment.

FIG. 8 is a flow chart illustrating a method 800 in a first wireless device, in accordance with an embodiment. The method begins at step 804, where the first wireless device obtains a PHR configuration including one or more PHR configuration parameters for an enhanced PHR based at least in part on one or more D2D transmissions of the first wireless device. In certain embodiments, obtaining the PHR configuration may comprise one or more of using one or more pre-defined parameters or pre-defined rules to determine the PHR configuration, reading one of more PHR configuration parameters from an internal or an external memory, receiving one or more PHR configuration parameters from one or more nodes of the wireless communications network, and receiving an indication for the enhanced type of PHR. At step 808, the first wireless device estimates a power headroom (PH) according to the obtained PHR configuration, the estimated PH based at least in part on the one or more D2D transmissions of the first wireless device.

At step 812, the first wireless device transmits an enhanced PHR to a node of the wireless communications network, the enhanced PHR comprising the PH estimated according to the obtained PHR configuration. In certain embodiments, the node of the wireless communications network may comprise a network node or a second wireless device. The enhanced PHR transmitted to the node of the wireless communications network may comprise one of a D2D PHR, an enhanced cellular PHR, or a hybrid PHR. The D2D PHR may comprise a function of one or more of a transmit power parameter for the one or more D2D transmissions of the first wireless device, a D2D transmission configuration parameter of the first wireless device and a parameter characterizing the distance and/or radio propagation environment between the first wireless device and the node of the wireless communications network. The enhanced cellular PHR may comprise a PHR that reflects a transmit power for one or more cellular transmissions of the first wireless device and is calculated based at least in part on the one or more PHR configuration parameters of the first wireless device. The hybrid PHR may comprise a function of one or more cellular parameters and one or more D2D parameters. The one or more D2D parameters may comprise one or more of a transmit power parameter for the one or more D2D transmissions of the first wireless device, a D2D transmission configuration parameter of the first wireless device, and a parameter characterizing the distance and/or radio propagation environment between the first wireless device and the node of the wireless communications network.

In certain embodiments, the enhanced PHR may be transmitted to the node of the wireless communications network in response to a trigger event. The trigger event may comprise one or more of: a D2D link pathloss change; an activation of a D2D operation; an increase in D2D transmission intensity; a change in a power reduction parameter or in a transmit power configuration for a D2D transmission; and a comparison of an amount of one or more of the D2D link pathloss change, the increase in D2D transmission intensity, and the change in power reduction parameter to one or more thresholds. In certain embodiments, the method may further comprise determining one or more time-frequency resources to use for transmitting the PHR.

In certain embodiments, the enhanced cellular PHR may account for one or more D2D transmissions of the wireless device by: avoiding estimating or triggering PH in subframes in which the first wireless device transmits one or more D2D transmissions; avoiding estimating or triggering PH in subframes in which the first wireless device transmits one or more specific types of D2D transmissions; avoiding estimating or triggering PH in subframes overlapping at least in part in time with any of the one or more D2D transmissions; avoiding estimating or triggering PH in subframes overlapping at least in part in time with any of the one or more specific types of D2D transmissions; compensating the PH reflecting cellular transmissions for the D2D transmissions comprised or overlapping at least in part with a subframe used as a reference for the PH estimation; and avoiding estimating or triggering PH in a time period during which the amount of D2D transmissions exceeds a threshold.

Figure 9:
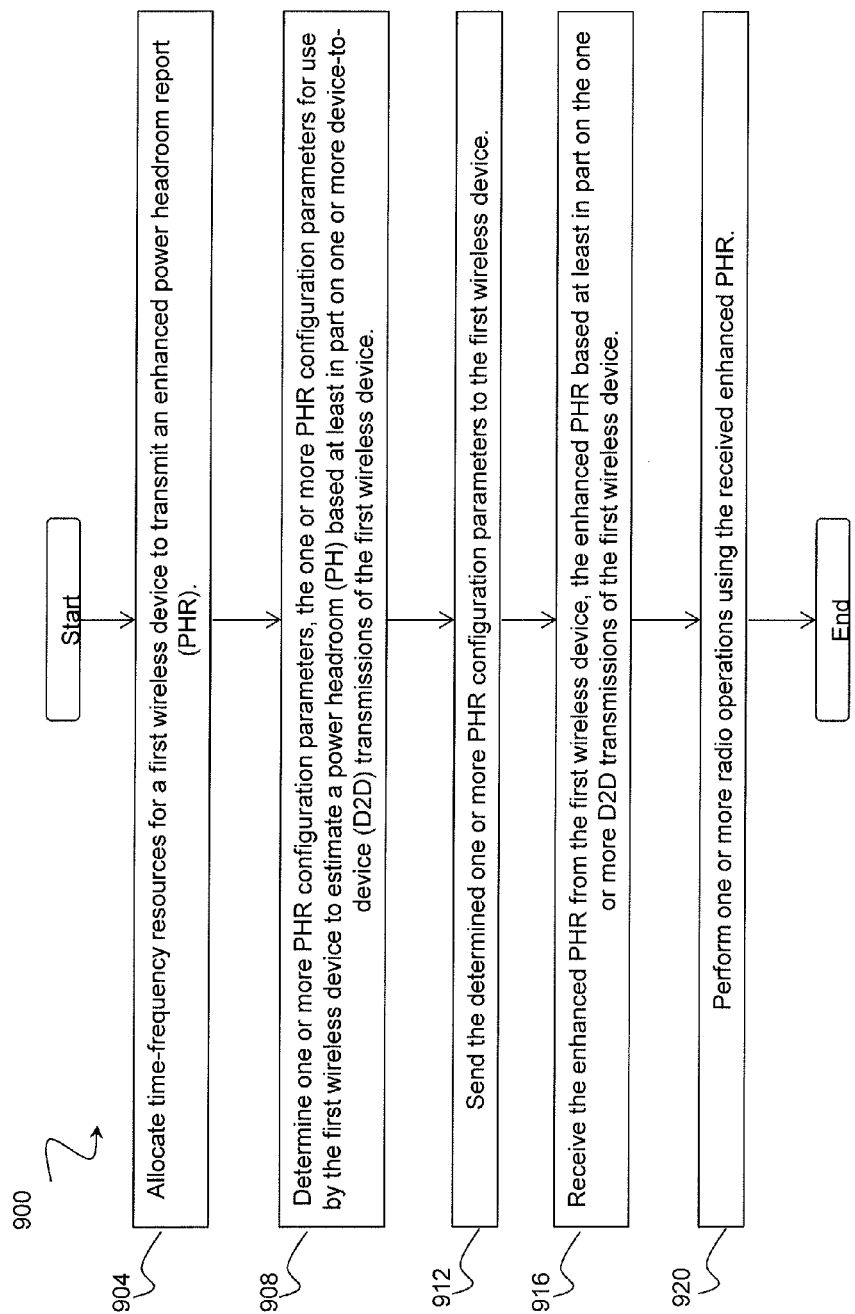
FIG. 9 is a flow chart illustrating a method in a node, in accordance with an embodiment.

FIG. 9 is a flow chart illustrating a method 900 in a node of a wireless communications network, in accordance with an embodiment. The method begins at step 904, where time-frequency resources are allocated for a first wireless device to transmit an enhanced PHR. In certain embodiments, the node of the wireless communications network may comprise a network node or a second wireless device.

At step 908, the node determines one or more PHR configuration parameters, the one or more PHR configuration parameters for use by the first wireless device to estimate a PH based at least in part on one or more D2D transmissions of the first wireless device. In certain embodiments, determining the one or more PHR configuration parameters comprises one or more of: reading the one or more PHR configuration parameters from an internal or an external memory; using one or more pre-defined parameters to determine the one or more PHR configuration parameters; and determining the one or more PHR configuration parameters based at least in part on one or more pre-defined rules or pre-defined requirements. The one or more configuration parameters may comprise one or more of: time and/or frequency resources; a timer controlling a time of transmission of the PHR; a PHR type indication; one or more subframes eligible for PH estimation; a reference subframe index or subframe type; an aggregate function type; a carrier frequency for which PH is to be evaluated and/or reported; and a trigger configuration comprising one or more of a trigger type and one or more trigger parameters.

At step 912, the node sends the determined one or more PHR configuration parameters to the first wireless device. In certain embodiments, the method may further comprise determining when the one or more D2D transmissions by the wireless device occur.

At step 916, the node of the wireless communications network receives the enhanced PHR from the first wireless device, the enhanced PHR based at least in part on the one or more D2D transmissions of the first wireless device. In certain embodiments, the received enhanced PHR may comprise one of a D2D PHR, an enhanced cellular PHR, and a hybrid PHR. The D2D PHR may comprise a function of one or more of: a transmit power parameter for the one or more D2D transmissions of the first wireless device; a D2D transmission configuration parameter of the first wireless device; and a parameter characterizing the distance and/or radio propagation environment between the first wireless device and the node of the wireless communications network. The enhanced cellular PHR may comprise a PHR that reflects a transmit power for one or more cellular transmissions of the first wireless device and is calculated based at least in part on the one or more configuration parameters of the first wireless device. The hybrid PHR may comprise a function of one or more cellular parameters and one or more D2D parameters. The one or more D2D parameters may comprise one or more of a transmit power parameter for the one or more D2D transmissions of the first wireless device; a D2D transmission configuration parameter of the first wireless device; and a parameter characterizing the distance and/or radio propagation environment between the first wireless device and the node of the wireless communications network.

At step 920, the node of the wireless communications network performs one or more radio operations using the received enhanced PHR. In certain embodiments, performing one or more radio operations using the received enhanced PHR may comprise one or more of: estimating a pathloss used for defining a received power headroom for one or more of a cellular link and a D2D link; power controlling one or more of one or more uplink cellular transmissions, one or more downlink cellular transmissions, and one or more D2D transmissions; configuring power reduction; and determining whether a cellular or a D2D link will be used for a data transmission.

In certain embodiments, the enhanced cellular PHR may account for one or more D2D transmission(s) by one or more of: avoiding estimating or triggering PH in subframes in which the first wireless device transmits one or more D2D transmissions; avoiding estimating or triggering PH in subframes in which the first wireless device transmits one or more specific types of D2D transmissions; avoiding estimating or triggering PH in subframes overlapping at least in part in time with any of the one or more D2D transmissions; avoiding estimating or triggering PH in subframes overlapping at least in part in time with any of the one or more specific types of D2D transmissions; compensating the PH reflecting cellular transmissions for the D2D transmissions comprised or overlapping at least in part with a subframe used as a reference for the PH estimation; and avoiding estimating or triggering PH in a time period during which the amount of D2D transmissions exceeds a threshold.

Figure 10:
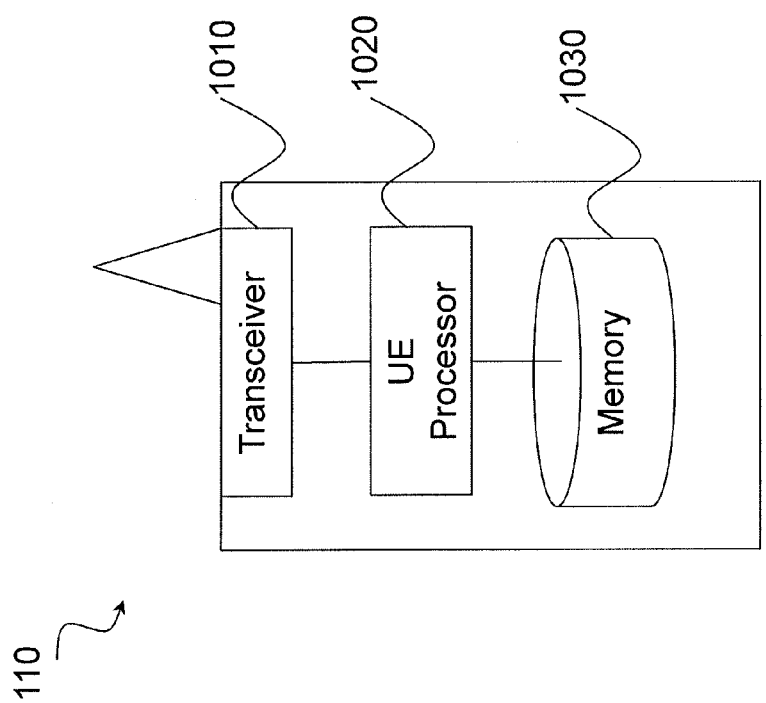
FIG. 10 is a schematic block diagram of an exemplary wireless device, in accordance with certain embodiments.

FIG. 10 is a schematic block diagram of an exemplary wireless device 110, in accordance with certain embodiments. Wireless device 110 may refer to any type of wireless device communicating with a node and/or with another wireless device in a cellular or mobile communication system. Examples of wireless device 110 include a mobile phone, a smart phone, a PDA (Personal Digital Assistant), a portable computer (e.g., laptop, tablet), a sensor, a modem, a machine-type-communication (MTC) device/machine to machine (M2M) device, laptop embedded equipment (LEE), laptop mounted equipment (LME), USB dongles, a device-to-device capable device, or another device that can provide wireless communication. A wireless device 110 may also be referred to as user equipment (UE), a station (STA), a device, or a terminal in some embodiments. Wireless device 110 includes transceiver 1010, processor 1020, and memory 1030. In some embodiments, transceiver 1010 facilitates transmitting wireless signals to and receiving wireless signals from network node 115 (e.g., via an antenna), processor 1020 executes instructions to provide some or all of the functionality described above as being provided by wireless device 110, and memory 1030 stores the instructions executed by processor 1020.

Processor 1020 may include any suitable combination of hardware and software implemented in one or more modules to execute instructions and manipulate data to perform some or all of the described functions of wireless device 110. In some embodiments, processor 1020 may include, for example, one or more computers, one or more central processing units (CPUs), one or more microprocessors, one or more applications, and/or other logic.

Memory 1030 is generally operable to store instructions, such as a computer program, software, an application including one or more of logic, rules, algorithms, code, tables, etc. and/or other instructions capable of being executed by a processor. Examples of memory 1030 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

Other embodiments of wireless device 110 may include additional components beyond those shown in FIG. 10 that may be responsible for providing certain aspects of the wireless device's functionality, including any of the functionality described above and/or any additional functionality (including any functionality necessary to support the solution described above).

In certain embodiments, wireless device 110 may include one or more modules. For example, wireless device 110 may include a determining module, a communication module, a receiver module, an input module, a display module, and any other suitable modules. The determining module may perform the processing functions of wireless device 110. For example, the determining module may obtain a PHR configuration including one or more PHR configuration parameters for an enhanced PHR. As another example, the determining module may estimate a PH according to the obtained PHR configuration. As yet another example, the determining module may determine one or more time-frequency resources to use for transmitting the enhanced PHR. As still another example, the determining module may perform one or more radio operations using the received PHR. The determining module may include or be included in processor 1020. The determining module may include analog and/or digital circuitry configured to perform any of the functions of the determining module and/or processor 1020. The functions of the determining module described above may, in certain embodiments, be performed in one or more distinct modules.

The communication module may perform the transmission functions of wireless device 110. The communication module may transmit messages to one or more of network nodes 115 of network 200. For example, the communication module may transmit an enhanced PHR to a node of the wireless communications network, the enhanced PHR comprising the PH estimated according to the obtained PHR configuration. The communication module may include a transmitter and/or a transceiver, such as transceiver 1010. The communication module may include circuitry configured to wirelessly transmit messages and/or signals. In particular embodiments, the communication module may receive messages and/or signals for transmission from the determining module.

The receiving module may perform the receiving functions of wireless device 110. For example, the receiving module may obtain a PHR configuration including one or more PHR configuration parameters for an enhanced PHR. The receiving module may receive an enhanced PHR from another wireless device 110. The receiving module may include a receiver and/or a transceiver. The receiving module may include circuitry configured to wirelessly receive messages and/or signals. In particular embodiments, the receiving module may communicate received messages and/or signals to the determining module.

The input module may receive user input intended for wireless device 110. For example, the input module may receive key presses, button presses, touches, swipes, audio signals, video signals, and/or any other appropriate signals. The input module may include one or more keys, buttons, levers, switches, touchscreens, microphones, and/or cameras. The input module may communicate received signals to the determining module.

The display module may present signals on a display of wireless device 110. The display module may include the display and/or any appropriate circuitry and hardware configured to present signals on the display. The display module may receive signals to present on the display from the determining module.

Figure 11:
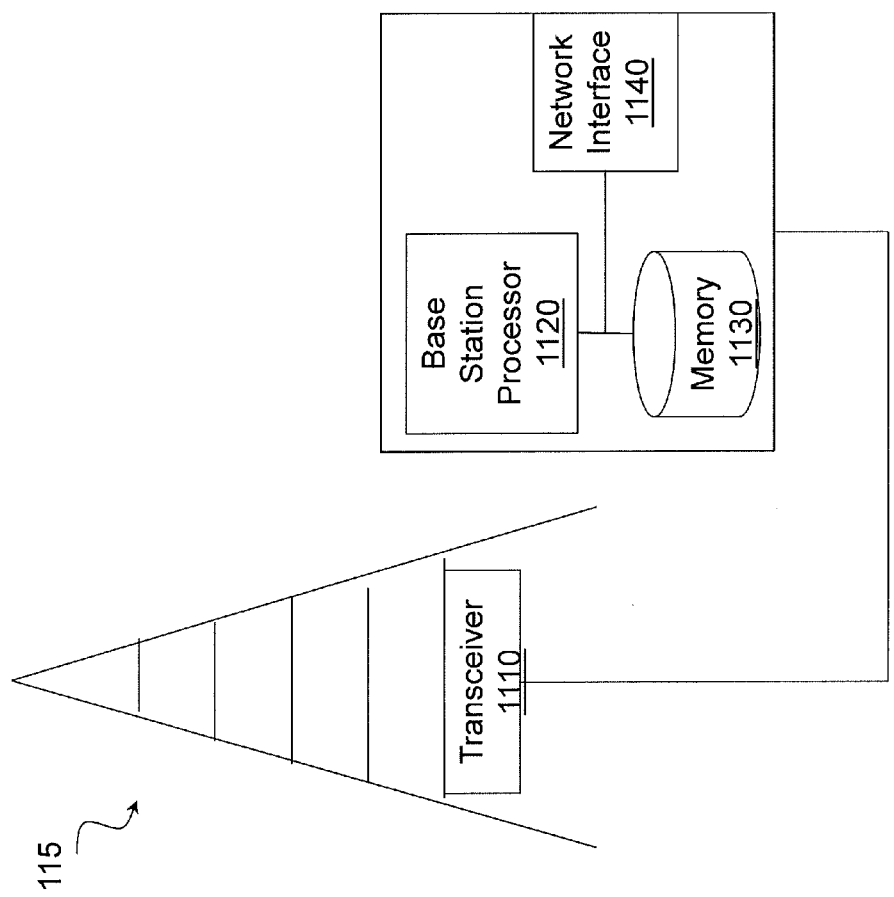
FIG. 11 is a schematic block diagram of an exemplary network node, in accordance with certain embodiments.

FIG. 11 is a schematic block diagram of an exemplary network node 115, in accordance with certain embodiments. Network node 115 may be any type of radio network node or any network node that communicates with a UE and/or with another network node. Examples of network node 115 include an eNodeB, a node B, a base station, a wireless access point (e.g., a Wi-Fi access point), a low power node, a base transceiver station (BTS), relay, donor node controlling relay, transmission points, transmission nodes, remote RF unit (RRU), remote radio head (RRH), multi-standard radio (MSR) radio node such as MSR BS, nodes in distributed antenna system (DAS), O&M, OSS, SON, positioning node (e.g., E-SMLC), MDT, or any other suitable network node. Network nodes 115 may be deployed throughout network 200 as a homogenous deployment, heterogeneous deployment, or mixed deployment. A homogeneous deployment may generally describe a deployment made up of the same (or similar) type of network nodes 115 and/or similar coverage and cell sizes and inter-site distances. A heterogeneous deployment may generally describe deployments using a variety of types of network nodes 115 having different cell sizes, transmit powers, capacities, and inter-site distances. For example, a heterogeneous deployment may include a plurality of low-power nodes placed throughout a macro-cell layout. Mixed deployments may include a mix of homogenous portions and heterogeneous portions.

Network node 115 may include one or more of transceiver 1110, processor 1120, memory 1130, and network interface 1140. In some embodiments, transceiver 1110 facilitates transmitting wireless signals to and receiving wireless signals from wireless device 110 (e.g., via an antenna), processor 1120 executes instructions to provide some or all of the functionality described above as being provided by a network node 115, memory 1130 stores the instructions executed by processor 1120, and network interface 1140 communicates signals to backend network components, such as a gateway, switch, router, Internet, Public Switched Telephone Network (PSTN), core network nodes 130, radio network controllers 120, etc.

Processor 1120 may include any suitable combination of hardware and software implemented in one or more modules to execute instructions and manipulate data to perform some or all of the described functions of network node 115. In some embodiments, processor 1120 may include, for example, one or more computers, one or more central processing units (CPUs), one or more microprocessors, one or more applications, and/or other logic.

Memory 1130 is generally operable to store instructions, such as a computer program, software, an application including one or more of logic, rules, algorithms, code, tables, etc. and/or other instructions capable of being executed by a processor. Examples of memory 1130 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 1140 is communicatively coupled to processor 1120 and may refer to any suitable device operable to receive input for network node 115, send output from network node 115, perform suitable processing of the input or output or both, communicate to other devices, or any combination of the preceding. Network interface 1140 may include appropriate hardware (e.g., port, modem, network interface card, etc.) and software, including protocol conversion and data processing capabilities, to communicate through a network.

In certain embodiments, network node 115 may include a determining module, a communication module, a receiving module, and any other suitable modules. In some embodiments, one or more of the determining module, communication module, receiving module, or any other suitable module may be implemented using one or more processors 1120 of FIG. 11. In certain embodiments, the functions of two or more of the various modules may be combined into a single module.

The determining module may perform the processing functions of network node 115. For example, the determining module may determine one or more PHR configuration parameters. As another example, the determining module may determine when the one or more D2D transmissions by the wireless device occur. As yet another example, the determining module may perform one or more radio operations using the received PHR. As another example, the determining module may allocate time-frequency resources for the first wireless device to transmit the enhanced PHR.

The communication module may perform the transmission functions of network node 115. The communication module may transmit messages to one or more of wireless devices 110. For example, the communication module may send the determined one or more PHR configuration parameters to the first wireless device. The communication module may include a transmitter and/or a transceiver, such as transceiver 1110. The communication module may include circuitry configured to wirelessly transmit messages and/or signals. In particular embodiments, the communication module may receive messages and/or signals for transmission from the determining module or any other module.

The receiving module may perform the receiving functions of network node 115. The receiving module may receive any suitable information from a wireless device. For example, the receiving module may receive an enhanced PHR from a first wireless device. The receiving module may include a receiver and/or a transceiver. The receiving module may include circuitry configured to wirelessly receive messages and/or signals. In particular embodiments, the receiving module may communicate received messages and/or signals to the determining module or any other suitable module.

Other embodiments of network node 115 may include additional components beyond those shown in FIG. 11 that may be responsible for providing certain aspects of the radio network node's functionality, including any of the functionality described above and/or any additional functionality (including any functionality necessary to support the solutions described above). The various different types of network nodes may include components having the same physical hardware but configured (e.g., via programming) to support different radio access technologies, or may represent partly or entirely different physical components.

Figure 12:
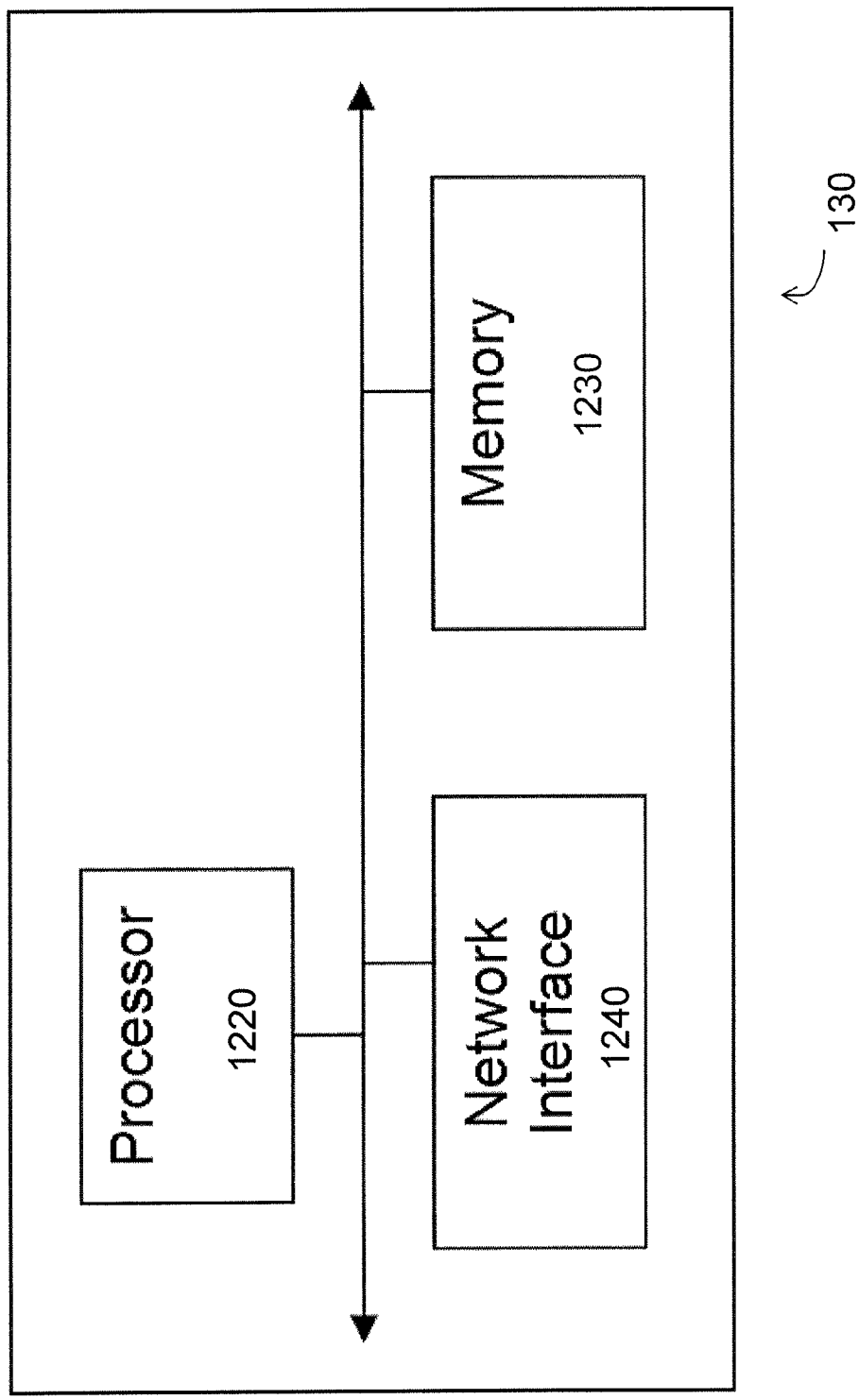
FIG. 12 is a schematic block diagram of an exemplary radio network controller or core network node, in accordance with certain embodiments.

FIG. 12 is a schematic block diagram of an exemplary radio network controller or core network node 130, in accordance with certain embodiments. Examples of network nodes can include a mobile switching center (MSC), a serving GPRS support node (SGSN), a mobility management entity (MME), a radio network controller (RNC), a base station controller (BSC), and so on. The radio network controller or core network node 130 includes processor 1220, memory 1230, and network interface 1240. In some embodiments, processor 1220 executes instructions to provide some or all of the functionality described above as being provided by the network node, memory 1230 stores the instructions executed by processor 1220, and network interface 1240 communicates signals to any suitable node, such as a gateway, switch, router, Internet, Public Switched Telephone Network (PSTN), network nodes 115, radio network controllers or core network nodes 130, etc.

Processor 1220 may include any suitable combination of hardware and software implemented in one or more modules to execute instructions and manipulate data to perform some or all of the described functions of the radio network controller 120 or core network node 130. In some embodiments, processor 1220 may include, for example, one or more computers, one or more central processing units (CPUs), one or more microprocessors, one or more applications, and/or other logic.

Memory 1230 is generally operable to store instructions, such as a computer program, software, an application including one or more of logic, rules, algorithms, code, tables, etc. and/or other instructions capable of being executed by a processor. Examples of memory 1230 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 1240 is communicatively coupled to processor 1220 and may refer to any suitable device operable to receive input for the network node, send output from the network node, perform suitable processing of the input or output or both, communicate to other devices, or any combination of the preceding. Network interface 1240 may include appropriate hardware (e.g., port, modem, network interface card, etc.) and software, including protocol conversion and data processing capabilities, to communicate through a network.

Other embodiments of the network node may include additional components beyond those shown in FIG. 12 that may be responsible for providing certain aspects of the network node's functionality, including any of the functionality described above and/or any additional functionality (including any functionality necessary to support the solution described above).

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the disclosure. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

Abbreviations used in the preceding description include:
BS Base Station
CoMP Coordinated Multiple Point Transmission and Reception
CRS Cell-specific Reference Signal
CSI Channel State Information
CSI-RS CSI reference signal
D2D Device-to-device
DL Downlink
ID Identity
L1 Layer 1
L2 Layer 2
LTE Long Term Evolution
MAC Medium Access Control
OFDM Orthogonal Frequency Division Multiplexing
PH Power Headroom
PHR Power Headroom Report
PSS Primary Synchronization Signal
RAT Radio Access Technology
RE Resource Element
RB Resource Block
RRH Remote radio head
RRM Radio Resource Management
RRU Remote radio unit
RSRQ Reference signal received quality
RSRP Reference signal received power
SFN Single Frequency Network
SSS Secondary Synchronization Signal
UE User Equipment
UL Uplink
SON Self Organizing Network
RSSI Received signal strength indicator
O&M Operational and Maintenance
OSS Operational Support Systems
MPR Maximum Power Reduction
A-MPR Additional Maximum Power Reduction
P-MPR Power Management Maximum Power Reduction

The invention claimed is:

1. A method in a first wireless device of a wireless communications network, comprising:
    obtaining a power headroom report (PHR) configuration including one or more PHR configuration parameters for an enhanced PHR based at least in part on one or more device-to-device (D2D) transmissions of the first wireless device;
    estimating a power headroom (PH) according to the obtained PHR configuration, the estimated PH based at least in part on the one or more D2D transmissions of the first wireless device; and
    transmitting an enhanced PHR to a node of the wireless communications network, the enhanced PHR comprising the PH estimated according to the obtained PHR configuration.

2. The method of claim 1, wherein the node of the wireless communications network comprises a network node or a second wireless device.

3. The method of claim 1, wherein the enhanced PHR transmitted to the node of the wireless communications network comprises one of:
    a D2D PHR comprising a function of one or more of:
        a transmit power parameter for the one or more D2D transmissions of the first wireless device;
        a D2D transmission configuration parameter of the first wireless device; and
        a parameter characterizing at least one of a distance between the first wireless device and the node of the wireless communications network and a radio propagation environment between the first wireless device and the node of the wireless communications network;
    an enhanced cellular PHR comprising a PHR that reflects a transmit power for one or more cellular transmissions of the first wireless device and is calculated based at least in part on the one or more PHR configuration parameters of the first wireless device; and
    a hybrid PHR comprising a function of one or more cellular parameters and one or more D2D parameters, the one or more D2D parameters comprising one or more of:
        a transmit power parameter for the one or more D2D transmissions of the first wireless device;
        a D2D transmission configuration parameter of the first wireless device; and
        a parameter characterizing at least one of the distance between the first wireless device and the node of the wireless communications network and the radio propagation environment between the first wireless device and the node of the wireless communications network.

4. The method of claim 3, wherein the enhanced cellular PHR accounts for one or more D2D transmission(s) by one or more of:
- avoiding estimating or triggering PH in subframes in which the first wireless device transmits one or more D2D transmissions;
- avoiding estimating or triggering PH in subframes in which the first wireless device transmits one or more specific types of D2D transmissions;
- avoiding estimating or triggering PH in subframes overlapping at least in part in time with any of the one or more D2D transmissions;
- avoiding estimating or triggering PH in subframes overlapping at least in part in time with any of the one or more specific types of D2D transmissions;
- compensating the PH reflecting cellular transmissions for the D2D transmissions comprised or overlapping at least in part with a subframe used as a reference for the PH estimation; and
- avoiding estimating or triggering PH in a time period during which the amount of D2D transmissions exceeds a threshold.

5. The method of claim 1, wherein obtaining a PHR configuration comprises one of:
- using one or more pre-defined parameters or pre-defined rules to determine the PHR configuration;
- reading one of more PHR configuration parameters from an internal or an external memory;
- receiving one or more PHR configuration parameters from one or more nodes of the wireless communications network; and
- receiving an indication for the enhanced type of PHR.

6. The method of claim 1, wherein the enhanced PHR is transmitted to the node of the wireless communications network in response to a trigger event.

7. The method of claim 6, wherein the trigger event comprises one or more of:
- a D2D link pathloss change;
- an activation of a D2D operation;
- an increase in D2D transmission intensity;
- a change in a power reduction parameter or in a transmit power configuration for a D2D transmission; and
- a comparison of an amount of one or more of the D2D link pathloss change, the increase in D2D transmission intensity, and the change in power reduction parameter to one or more thresholds.

8. The method of claim 1, further comprising determining one or more time-frequency resources to use for transmitting the enhanced PHR.

9. A method in a node of a wireless communications network, comprising:
- determining one or more power headroom report (PHR) configuration parameters, the one or more PHR configuration parameters for use by a first wireless device to estimate a power headroom (PH) based at least in part on one or more device-to-device (D2D) transmissions of the first wireless device; and
- sending the determined one or more PHR configuration parameters to the first wireless device.

10. The method of claim 9, wherein determining the one or more PHR configuration parameters comprises one or more of:
- reading the one or more PHR configuration parameters from an internal or an external memory;
- using one or more pre-defined parameters to determine the one or more PHR configuration parameters; and
- determining the one or more PHR configuration parameters based at least in part on one or more pre-defined rules or pre-defined requirements.

11. The method of claim 9, further comprising determining when the one or more D2D transmissions by the wireless device occur.

12. The method of claim 9, wherein the node of the wireless communications network comprises a network node or a second wireless device.

13. The method of claim 9, wherein the one or more configuration parameters comprise one or more of:
- at least one of: one or more time resources and one or more frequency resources;
- a timer controlling a time of transmission of the PHR;
- a PHR type indication;
- one or more subframes eligible for PH estimation;
- a reference subframe index or subframe type;
- an aggregate function type;
- at least one of a carrier frequency for which PH is to be evaluated and a carrier frequency for which PH is to be reported; and
- a trigger configuration comprising one or more of a trigger type and one or more trigger parameters.

14. A method in a node of a wireless communications network, comprising:
- receiving an enhanced power headroom report (PHR) from a first wireless device, the enhanced PHR based at least in part on one or more device-to-device (D2D) transmissions of the first wireless device; and
- performing one or more radio operations using the received PHR.

15. The method of claim 14, wherein the received enhanced PHR comprises one of:
- a D2D PHR comprising a function of one or more of:
  - a transmit power parameter for the one or more D2D transmissions of the first wireless device;
  - a D2D transmission configuration parameter of the first wireless device; and
  - a parameter characterizing at least one of a distance between the first wireless device and the node of the wireless communications network and a radio propagation environment between the first wireless device and the node of the wireless communications network;
- an enhanced cellular PHR comprising a PHR that reflects a transmit power for one or more cellular transmissions of the first wireless device and is calculated based at least in part on the one or more PHR configuration parameters of the first wireless device; and
- a hybrid PHR comprising a function of one or more cellular parameters and one or more D2D parameters, the one or more D2D parameters comprising one or more of:
  - a transmit power parameter for the one or more D2D transmissions of the first wireless device;
  - a D2D transmission configuration parameter of the first wireless device; and
  - a parameter characterizing at least one of the distance between the first wireless device and the node of the wireless communications network and the radio propagation environment between the first wireless device and the node of the wireless communications network.

16. The method of claim 15, wherein the enhanced cellular PHR accounts for one or more D2D transmission(s) by one or more of:

avoiding estimating or triggering PH in subframes in which the first wireless device transmits one or more D2D transmissions;

avoiding estimating or triggering PH in subframes in which the first wireless device transmits one or more specific types of D2D transmissions;

avoiding estimating or triggering PH in subframes overlapping at least in part in time with any of the one or more D2D transmissions;

avoiding estimating or triggering PH in subframes overlapping at least in part in time with any of the one or more specific types of D2D transmissions;

compensating the PH reflecting cellular transmissions for the D2D transmissions comprised or overlapping at least in part with a subframe used as a reference for the PH estimation; and avoiding estimating or triggering PH in a time period during which the amount of D2D transmissions exceeds a threshold.

17. The method of claim 14, wherein performing one or more radio operations using the received enhanced PHR comprises one or more of:

estimating a pathloss used for defining a received power headroom for one or more of a cellular link and a D2D link;

power controlling one or more of one or more uplink cellular transmissions, one or more downlink cellular transmissions, and one or more D2D transmissions;

configuring power reduction; and determining whether a cellular or a D2D link will be used for a data transmission.

18. The method of claim 14, further comprising:

determining one or more PHR configuration parameters, the one or more PHR configuration parameters for use by the first wireless device to estimate a power headroom (PH) based at least in part on one or more D2D transmissions of the first wireless device; and sending the determined one or more PHR configuration parameters to the first wireless device.

19. The method of claim 14, wherein the node of the wireless communications network comprises a network node or a second wireless device.

20. The method of claim 14, wherein the node of the wireless communications network comprises a network node, and the method further comprises allocating time-frequency resources for the first wireless device to transmit the enhanced PHR.

21. A first wireless device of a wireless communications network, comprising:

one or more processors configured to:

obtain a power headroom report (PHR) configuration including one or more PHR configuration parameters for an enhanced PHR based at least in part on one or more device-to-device (D2D) transmissions of the first wireless device;

estimate a power headroom (PH) according to the obtained PHR configuration, the estimated PH based at least in part on the one or more D2D transmissions of the first wireless device; and transmit an enhanced PHR to a node of the wireless communications network, the enhanced PHR comprising the PH estimated according to the obtained PHR configuration.

22. The first wireless device of claim 21, wherein the node of the wireless communications network comprises a network node or a second wireless device.

23. The first wireless device of claim 21, wherein the enhanced PHR transmitted to the node of the wireless communications network comprises one of:

a D2D PHR comprising a function of one or more of:
a transmit power parameter for the one or more D2D transmissions of the first wireless device;
a D2D transmission configuration parameter of the first wireless device; and
a parameter characterizing at least one of a distance between the first wireless device and the node of the wireless communications network and a radio propagation environment between the first wireless device and the node of the wireless communications network;

an enhanced cellular PHR comprising a PHR that reflects a transmit power for one or more cellular transmissions of the first wireless device and is calculated based at least in part on the one or more configuration parameters of the first wireless device; and a hybrid PHR comprising a function of one or more cellular parameters and one or more D2D parameters, the one or more D2D parameters comprising one or more of:
a transmit power parameter for the one or more D2D transmissions of the first wireless device;
a D2D transmission configuration parameter of the first wireless device; and
a parameter characterizing at least one of the distance between the first wireless device and the node of the wireless communications network and the radio propagation environment between the first wireless device and the node of the wireless communications network.

24. The first wireless device of claim 21, wherein the one or more processors configured to estimate a PH according to the obtained PHR configuration comprise one or more processors configured to estimate an enhanced cellular PHR that accounts for one or more D2D transmission(s) by one or more of:

avoiding estimating or triggering PH in subframes in which the first wireless device transmits one or more D2D transmissions;

avoiding estimating or triggering PH in subframes in which the first wireless device transmits one or more specific types of D2D transmissions;

avoiding estimating or triggering PH in subframes overlapping at least in part in time with any of the one or more D2D transmissions;

avoiding estimating or triggering PH in subframes overlapping at least in part in time with any of the one or more specific types of D2D transmissions;

compensating the PH reflecting cellular transmissions for the D2D transmissions comprised or overlapping at least in part with a subframe used as a reference for the PH estimation; and avoiding estimating or triggering PH in a time period during which the amount of D2D transmissions exceeds a threshold.

25. The first wireless device of claim 21, wherein the one or more processors configured to obtain a PHR configuration comprise one or more processors configured to perform one of:

use one or more pre-defined parameters or pre-defined rules to determine the PHR configuration;

read one or more PHR configuration parameters from an internal or an external memory;

receive one or more PHR configuration parameters from one or more nodes of the wireless communications network; and
receive an indication for the enhanced type of PHR.

26. The first wireless device of claim 21, wherein the one or more processors configured to transmit the enhanced PHR to the node of the wireless communications network comprise one or more processors configured to transmit the enhanced PHR to the node of the wireless communications network in response to a trigger event.

27. The first wireless device of claim 26, wherein the trigger event comprises one or more of:
a D2D link pathloss change;
an activation of a D2D operation;
an increase in D2D transmission intensity;
a change in a power reduction parameter or in a transmit power configuration for a D2D transmission; and
a comparison of an amount of one or more of the D2D link pathloss change, the increase in D2D transmission intensity, and the change in power reduction parameter to one or more thresholds.

28. The first wireless device of claim 21, further comprising determining one or more time-frequency resources to use for transmitting the enhanced PHR.

29. A node of a wireless communications network, comprising:
one or more processors configured to:
determine one or more power headroom report (PHR) configuration parameters, the one or more PHR configuration parameters for use by a first wireless device to estimate a power headroom (PH) based at least in part on one or more device-to-device (D2D) transmissions of the first wireless device; and
send the determined one or more PHR configuration parameters to the first wireless device.

30. The node of claim 29, wherein the one or more processors configured to determine the one or more PHR configuration parameters comprise one or more processors configured to perform one or more of:
read the one or more PHR configuration parameters from an internal or an external memory;
use one or more pre-defined parameters to determine the one or more PHR configuration parameters; and
determine the one or more PHR configuration parameters based at least in part on one or more pre-defined rules or pre-defined requirements.

31. The node of claim 29, wherein the one or more processors are further configured to determine when the one or more D2D transmissions by the wireless device occur.

32. The node of claim 29, wherein the node of the wireless communications network comprises a network node or a second wireless device.

33. The node of claim 29, wherein the one or more configuration parameters comprise one or more of:
at least one of: one or more time resources and one or more frequency resources;
a timer controlling a time of transmission of the PHR;
a PHR type indication;
one or more subframes eligible for PH estimation;
a reference subframe index or subframe type;
an aggregate function type;
at least one of a carrier frequency for which PH is to be evaluated and a carrier frequency for which PH is to be reported; and
a trigger configuration comprising one or more of a trigger type and one or more trigger parameters.

34. A node of a wireless communications network, comprising:
one or more processors configured to:
receive an enhanced power headroom report (PHR) from a first wireless device, the enhanced PHR based at least in part on one or more device-to-device (D2D) transmissions of the first wireless device; and
perform one or more radio operations using the received enhanced PHR.

35. The node of claim 34, wherein the received enhanced PHR comprises one of:
a D2D PHR comprising a function of one or more of:
a transmit power parameter for the one or more D2D transmissions of the first wireless device;
a D2D transmission configuration parameter of the first wireless device; and
a parameter characterizing at least one of a distance between the first wireless device and the node of the wireless communications network and a radio propagation environment between the first wireless device and the node of the wireless communications network;
an enhanced cellular PHR comprising a PHR that reflects a transmit power for one or more cellular transmissions of the first wireless device and is calculated based at least in part on the one or more configuration parameters of the first wireless device; and
a hybrid PHR comprising a function of one or more cellular parameters and one or more D2D parameters, the one or more D2D parameters comprising one or more of:
a transmit power parameter for the one or more D2D transmissions of the first wireless device;
a D2D transmission configuration parameter of the first wireless device; and
a parameter characterizing at least one of the distance between the first wireless device and the node of the wireless communications network and the radio propagation environment between the first wireless device and the node of the wireless communications network.

36. The node of claim 35, wherein the enhanced cellular PHR accounts for one or more D2D transmission(s) by one or more of:
avoiding estimating or triggering PH in subframes in which the first wireless device transmits one or more D2D transmissions;
avoiding estimating or triggering PH in subframes in which the first wireless device transmits one or more specific types of D2D transmissions;
avoiding estimating or triggering PH in subframes overlapping at least in part in time with any of the one or more D2D transmissions;
avoiding estimating or triggering PH in subframes overlapping at least in part in time with any of the one or more specific types of D2D transmissions;
compensating the PH reflecting cellular transmissions for the D2D transmissions comprised or overlapping at least in part with a subframe used as a reference for the PH estimation; and
avoiding estimating or triggering PH in a time period during which the amount of D2D transmissions exceeds a threshold.

37. The node of claim 34, wherein the one or more processors configured to perform one or more radio operations using the received enhanced PHR comprise one or more processors configured to perform one or more of:

estimating a pathloss used for defining a received power headroom for one or more of a cellular link and a D2D link;

power controlling one or more of one or more uplink cellular transmissions, one or more downlink cellular transmissions, and one or more D2D transmissions;

configuring power reduction; and determining whether a cellular or a D2D link will be used for a data transmission.

38. The node of claim 34, wherein the one or more processors are further configured to:

determine one or more PHR configuration parameters, the one or more PHR configuration parameters for use by the first wireless device to estimate a power headroom (PH) based at least in part on one or more D2D transmissions of the first wireless device; and send the determined one or more PHR configuration parameters to the first wireless device.

39. The node of claim 34, wherein the node of the wireless communications network comprises a network node or a second wireless device.

40. The node of claim 34, wherein the node of the wireless communications network comprises a network node, and the method further comprises allocating time-frequency resources for the first wireless device to transmit the enhanced PHR.

* * * * *